(12) United States Patent
Kim et al.

(10) Patent No.: US 9,544,891 B2
(45) Date of Patent: Jan. 10, 2017

(54) METHOD AND APPARATUS FOR RECEIVING DATA

(71) Applicant: LG ELECTRONICS INC., Seoul (KR)

(72) Inventors: Bonghoe Kim, Seoul (KR); Yunjung Yi, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/443,177

(22) PCT Filed: Oct. 10, 2013

(86) PCT No.: PCT/KR2013/009034
§ 371 (c)(1),
(2) Date: May 15, 2015

(87) PCT Pub. No.: WO2014/098358
PCT Pub. Date: Jun. 26, 2014

(65) Prior Publication Data
US 2015/0289237 A1    Oct. 8, 2015

Related U.S. Application Data

(60) Provisional application No. 61/738,400, filed on Dec. 18, 2012.

(51) Int. Cl.
*H04W 72/04* (2009.01)
*H04L 5/00* (2006.01)
*H04L 27/26* (2006.01)

(52) U.S. Cl.
CPC .......... *H04W 72/042* (2013.01); *H04L 5/0046* (2013.01); *H04L 5/0094* (2013.01); *H04L 27/26* (2013.01)

(58) Field of Classification Search
CPC ...... H04L 27/26; H04L 5/0094; H04L 5/0046; H04W 72/042
See application file for complete search history.

(56) References Cited

U.S. PATENT DOCUMENTS

2006/0067229 A1    3/2006  Frederiksen
2010/0115358 A1*   5/2010  Kotecha ................ H04L 1/1812
                                                        714/748

(Continued)

OTHER PUBLICATIONS

3GPP TS 36.213 V11.0.0, "3GPP; TSGRAN; E-UTRA; Physical layer procedures (Release 11)", Sep. 2012 (http://www.3gpp.org/ftp/Specs/archive/36_series/36.213/36213-b00.zip) See pp. 37-47.

(Continued)

*Primary Examiner* — Brian D Nguyen
(74) *Attorney, Agent, or Firm* — Dentons US LLP

(57) ABSTRACT

Disclosed are a method and apparatus for receiving data. The method for receiving data of a terminal includes the steps of: receiving, from a base station, information that a modulation scheme used in an allocated resource block is 256 quadrature amplitude modulation (QAM); determining a modulation and coding scheme (MCS) index and first resource allocation information on the allocated resource block on the basis of downlink control information (DCI); determining an ITBS on the basis of the MCS index; determining second resource allocation information on the basis of the first resource allocation information; and determining the transmission block size on the basis of the ITBS and second resource allocation information.

8 Claims, 19 Drawing Sheets

(56) References Cited

U.S. PATENT DOCUMENTS

| | | | | |
|---|---|---|---|---|
| 2010/0195614 | A1* | 8/2010 | Nimbalker | H04W 72/1289 370/330 |
| 2010/0303016 | A1 | 12/2010 | Jin et al. | |
| 2012/0201212 | A1* | 8/2012 | Xia | H04L 1/0027 370/329 |
| 2012/0287883 | A1* | 11/2012 | Sabella | H04L 1/0003 370/329 |
| 2012/0314678 | A1* | 12/2012 | Ko | H04L 5/0053 370/329 |
| 2014/0153625 | A1* | 6/2014 | Vojcic | H04L 1/005 375/224 |

OTHER PUBLICATIONS

LG Electronics, "TBS determination for PDSCH scheduled by EPDCCH", R1-124988. 3GPP TSG-RAN WG1 #71, New Orleans, USA, Nov. 12-16, 2012 (http://www.3gpp.org/ftp/tsg_ran/WG1_RL1/TSGR1_71/Docs/R1-124988.zip) See pp. 1-4.

Ericsson et al., "Clarification of TBS determination for PDSCH scheduled by EPDCCH", R1-124900, 3GPP TSG-RAN WG1#71, New Orleans, USA, Nov. 12-16, 2012 (http:/www.3gpp.org/ftp/tsg_ran/WG1_RL1/TSGR1_71/Docs/R1-124900.zip) See pp. 1-2.

* cited by examiner

METHOD AND APPARATUS FOR RECEIVING DATA

This application is a National Stage Entry of International Application No. PCT/KR2013/009034, filed Oct. 10, 2013, and claims the priority to and benefit of U.S. Provisional Nos. 61/738,400 filed on Dec. 18, 2012, each of which is hereby incorporated by reference in its entirety for all purposes as if fully set forth herein.

BACKGROUND OF THE INVENTION

Field of the Invention

The present invention relates to wireless communications, and more specifically, a method and apparatus for receiving data.

Related Art

Intensive research is underway in LTE (Long Term Evolution) release 12 for enhanced performance in light of capacity, coverage, coordination between cells, and costs. Under discussion is, from a technical perspective, adoption of various techniques including small cell enhancement, macro cell enhancement, new carrier type, and machine type communication for performance enhancements in LTE release 12.

Enhancements in capacity and transmission coverage, which LTE release 12 is targeting, may be achieved by small cell enhancement based on inter-site carrier aggregation, LTE-WLAN (Wireless Local Area Network) integration, and macro cell enhancement. Assuming the situation that the cell size is decreasing, the UE's movement is frequent, and the traffic signaled as the UE moves may increase. To address such issues, a method being discussed in LTE release 12 is to optimize small cells by reducing signaling that is made from RANs (Radio Access Network) to the core network based on small cell enhancement.

Further, the NCT (New Carrier Type) discussed in LTE release 12 is a newly defined frame type, different from the legacy frame configuration. The NCT may be a carrier type optimized for small cells, but this may also apply to macro cells. For example, the NCT may reduce overhead that is caused upon transmitting reference signals, such as CRSs (cell-specific reference signals), and may demodulate downlink control channels based on DM-RSs (demodulation reference signals). Newly defining the NCT may save the energy of base stations and reduce interference between HetNets (Heterogeneous Networks). Further, use of the NCT may decrease reference signal overhead that arises upon transmission of data through a plurality of downlink antennas. In the NCT, specifically, the legacy frame structure (for example, CP length, subframe structure, duplexing mode) is maintained, but the control channel and/or reference signal may be newly defined.

SUMMARY OF THE INVENTION

An object of the present invention is to provide a method for receiving data.

Another object of the present invention is to provide an apparatus for receiving data.

To achieve the above-described objects of the present invention, according to an aspect of the present invention, a method for receiving data by a user equipment (UE) includes the steps of: receiving, from a base station, information that a modulation scheme used in an allocated resource block is 256 quadrature amplitude modulation (QAM); determining a modulation and coding scheme (MCS) index and first resource allocation information on the allocated resource block on the basis of downlink control information (DCI); determining an ITBS on the basis of the MCS index; determining second resource allocation information on the basis of the first resource allocation information; and determining the transmission block size on the basis of the ITBS and second resource allocation information, wherein the first resource allocation information may be information on resource allocation in case a modulation scheme other than the 256QAM is used, and the second resource allocation information may be information on resource allocation in case the 256QAM is used as modulation scheme.

To achieve the above-described objects of the present invention, according to another aspect of the present invention, a user equipment (UE) operating in a wireless communication system includes a processor. The processor may be implemented to receive, from a base station, information that a modulation scheme used in an allocated resource block is 256quadrature amplitude modulation (QAM); determine a modulation and coding scheme (MCS) index and first resource allocation information on the allocated resource block on the basis of downlink control information (DCI); determine an ITBS on the basis of the MCS index; determine second resource allocation information on the basis of the first resource allocation information; and determine the transmission block size on the basis of the ITBS and second resource allocation information, wherein the first resource allocation information may be information on resource allocation in case a modulation scheme other than the 256QAM is used, and the second resource allocation information may be information on resource allocation in case the 256QAM is used as modulation scheme.

Data receiving performance may be enhanced.

DESCRIPTION OF EXEMPLARY EMBODIMENTS

A user equipment (UE) may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, a terminal, a wireless terminal, etc.

A base station (BS) is generally a fixed station that communicates with the UE and may be referred to as another terminology, such as an evolved Node-B (eNB), a base transceiver system (BTS), an access point, etc.

Hereinafter, it will be introduced that 3rd generation partnership project (3GPP) long term evolution (LTE) defined based on each release of 3GPP technical specification (TS) or operations of a wireless device and/or a BS in 3GPP LTE-A. Also, the present invention may be applied to various wireless communication network instead of 3GPP LTE/3GPP LTE-A. Hereinafter, LTE includes LTE and/or LTE-A.

Figure 1:
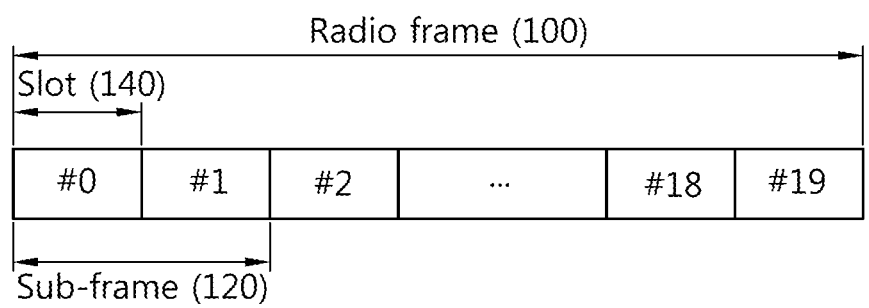
FIG. 1 illustrates the structure of a radio frame in LTE systems.

FIG. 1 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
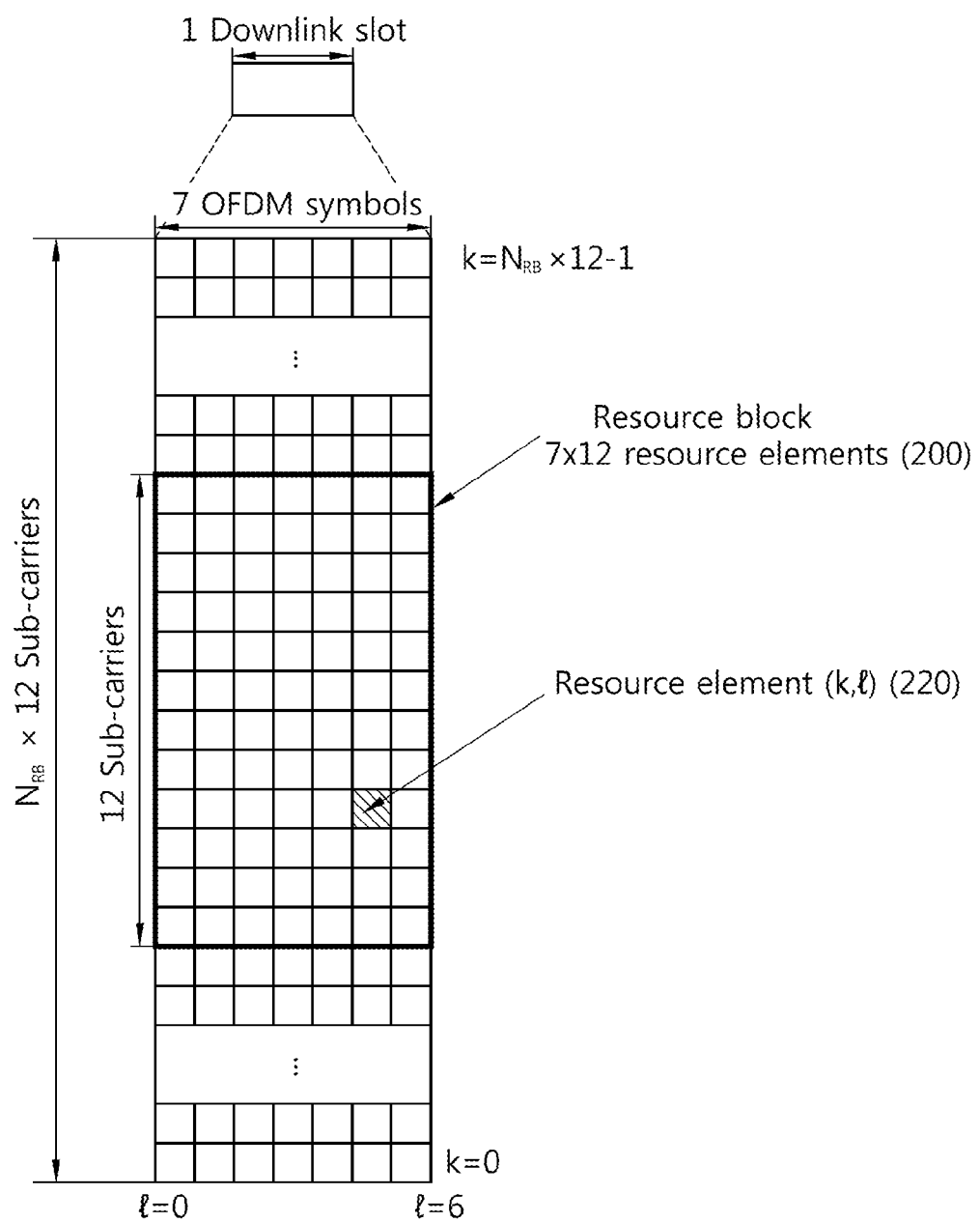
FIG. 2 illustrates an exemplary resource grid for a downlink slot.

FIG. 2 is a view illustrating an example of a resource grid for a downlink slot.

The downlink slot includes multiple OFDM symbols in a time domain, and includes NRB resource blocks in a frequency domain. NRB as a number of a resource block within the downlink slot is determined depending on downlink transmission bandwidth configured at a cell. For example, In a LTE system, NRB may be a value of 6 to 110 according to transmission bandwidth in use. A resource block 200 may include a plurality of subcarriers in the frequency domain. An uplink slot may have a structure same as that of the downlink slot.

Each element on the resource grid is referred to as a resource element 200. The resource element 220 on the resource grid can be identified by an index pair (k, 1). Here, k (k=0, . . . , NRBx12-1) is the index of the subcarrier in the frequency domain, and 1 (1=0, . . . , 6) is the indices of the OFDM symbols in the time domain.

Here, one resource block 200 may include 7 OFDM symbols in the time domain and 7×12 resource elements 220 composed of 12 subcarriers in the frequency domain. Such size is just an example, and it is possible that the number of subcarriers and OFDM symbols constructing one resource block 200 varies. The resource block pair indicate a resource unit including two resource blocks.

The number of the OFDM symbols included in one slot may vary depending on CP as mentioned above. In addition, the number of the resource block included in one slot may vary according to the size of the entire frequency bandwidth.

Figure 3:
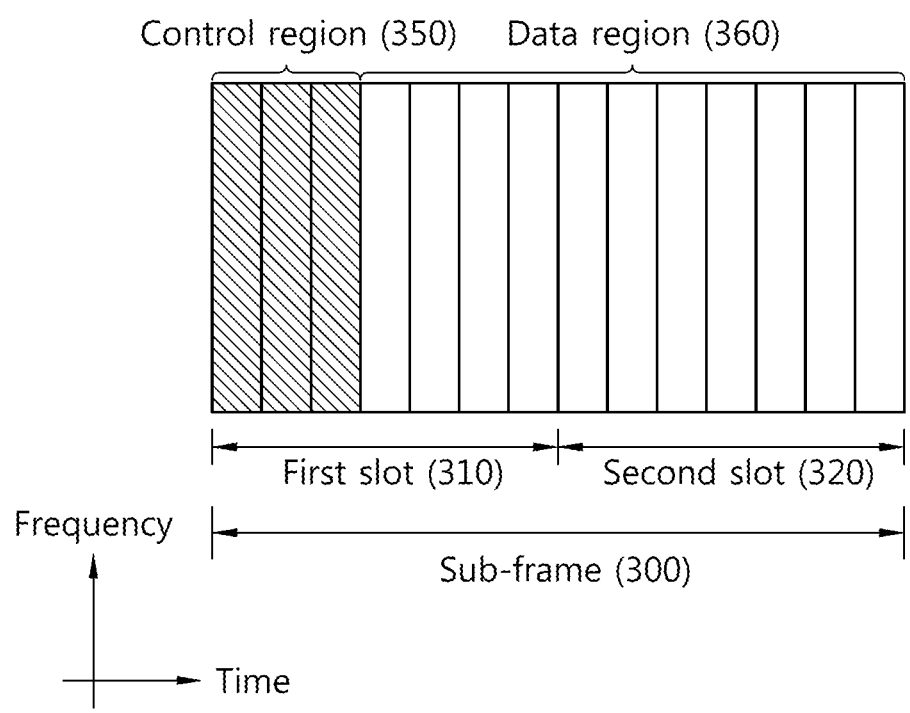
FIG. 3 illustrates the structure of a downlink sub-frame.

FIG. 3 is a view illustrating the structure of a downlink subframe.

The downlink subframe may be identified by two slots 310, 320 based on time. Each slot 310 or 320 includes 7

OFDM symbols in a normal CP. A resource region corresponding to 3 OFDM symbols (maximum 4 OFDM symbols for 1.4 MHz bandwidth), which arrive first, in the first slot may be used as a control region 350. Remaining OFDM symbols may be used as a data region 360 to which a traffic channel such as a physical downlink shared channel (PDSCH) is assigned.

PDCCH, for example, may be the control channel for transmitting information on resource allocation and a transmit format in a downlink-shared channel (DL-SCH), uplink shared channel (UL-SCH) resource allocation, information on paging on PCH, information on a system on the DL-SCH, and information on resource allocation for upper layer control messages such as random access response over the PDSCH, a transmit power control command set for individual UEs within a random UE group and voice over internet protocol (VoIP) activation. Multiple units for transmitting PDCCH data may be defined within the control region 350. A UE may monitor a plurality of units for transmitting PDCCH data to obtain control data. For example, PDCCH data may be transmitted to the UE based on an aggregation of one or more continuous control channel elements (CCE). The CCE may be one unit for transmitting PDCCH data. The CCE may include a plurality of resource element groups. The resource element group is a resource unit including available 4 resource elements.

A base station determines a PDCCH format based on downlink control information (DCI), and attaches a cyclic redundancy check (CRC) to the control information. The CRC is masked with a unique identifier (referred to as a radio network temporary identifier (RNTI)) according to an owner or a usage. If PDCCH is for a specific UE, a unique identifier of the UE, e.g., C-RNTI (cell-RNTI), may be masked to the CRC. IF PDCCH is for a paging message, an identifier indicating paging, e.g., P-RNTI (paging-RNTI), may be masked to the CRC. If PDCCH is for a system information block (SIB), a system information-RNTI (SI-RNTI)) may be masked to the CRC. In order to indicate random access response as response for a random access preamble of a UE, a random access-RNTI may be masked to the CRC.

Figure 4:
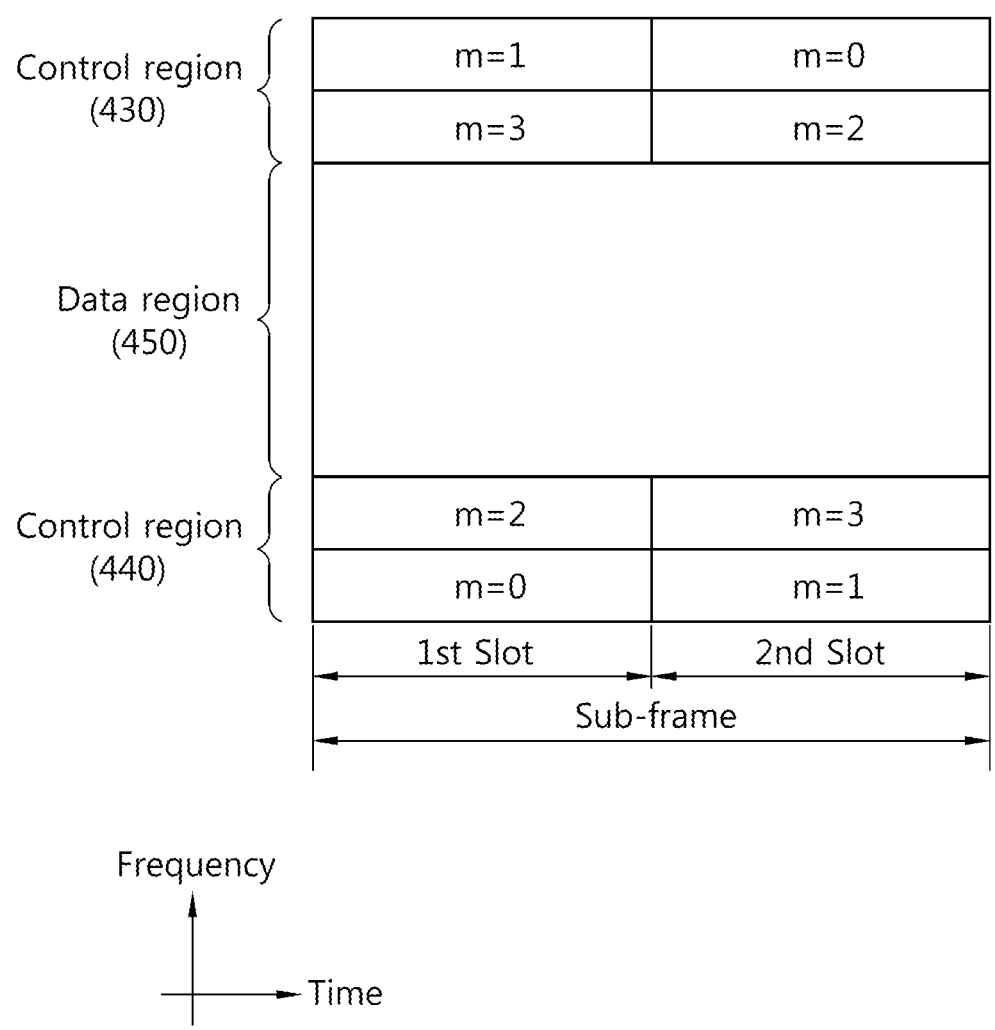
FIG. 4 illustrates the structure of an uplink sub-frame.

FIG. 4 shows the structure of an uplink subframe.

An uplink subframe may be divided into a control region 430 and 440 and a data region 450 based on the frequency domain. A physical uplink control channel (PUCCH) for transmitting uplink control information is allocated to the control region 430 and 440. A physical uplink shared channel (PUSCH) for transmitting data is allocated to the data region 450. When indicated by a higher layer, a wireless device may support a simultaneous transmission of the PUSCH and the PUCCH.

The PUCCH with respect to a wireless device may be allocated as a basis of a resource block (RB) pair in the subframe 400. The resource blocks belonging to the pair of resource blocks (RBs) may be allocated to different subcarriers in the first slot 410 and the second slot 420, respectively. The frequency occupied by the RBs belonging to the pair of RBs which are allocated to the PUCCH is changed based on a slot boundary. Such a PUCCH allocating method is called a frequency-hopped method. The wireless device may obtain a frequency diversity gain by transmitting uplink control information through different subcarriers according to time. In FIG. 4, m is a position index that indicates the logical frequency domain positions of the pair of RBs allocated to the PUCCH in the subframe.

The uplink control information transmitted on the PUCCH may include a hybrid automatic repeat request (HARQ) acknowledgement/non-acknowledgement (ACK/NACK), a channel quality indicator (CQI) indicates the state of a downlink channel, a scheduling request (SR) which is a request for uplink radio resource allocation, and the like.

The PUSCH is a channel which is mapped to an uplink shared channel (UL-SCH), a transport channel. The uplink data transmitted on the PUSCH may be a transport block, which is a data block for the UL-SCH transmitted during the TTI. The transport block may include user information. Or, the uplink data may be multiplexed data. The multiplexed data are data obtained by multiplexing the transport block for the UL-SCH and control information. For example, the control information multiplexed to data may include a CQI, a precoding matrix indicator (PMI), a HARQ, a rank indicator (RI), and the like. Or, the uplink data may include only the control information.

Figure 5:
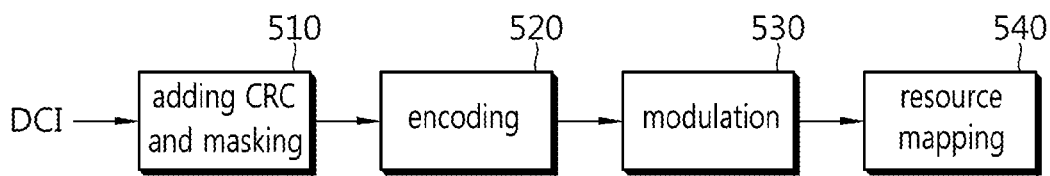
FIG. 5 is a block diagram illustrating a method for generating PDCCH data.

FIG. 5 is a block diagram showing a method for generating the PDCCH data.

FIG. 5 introduces a method for generating the PDCCH data in detail.

A wireless device performs blind decoding for PDCCH detection. The blind decoding may be performed based on an identifier which is masked from a cyclic redundancy check (CRC) of a received PDCCH (referred to as a candidate PDCCH). The wireless device may determine whether the received PDCCH data are its own control data by performing CRC error checking on the received PDCCH data.

A BS determines a PDCCH format according to a downlink control information (DCI) to be transmitted to a wireless device, attaches a cyclic redundancy check (CRC) to the DCI, and masks a unique identifier (referred to as a radio network temporary identifier (RNTI)) to the CRC according to an owner or usage of the PDCCH (block 510).

If the PDCCH is for a specific wireless device, the BS may mask a unique identifier of the wireless device, e.g., cell-RNTI (C-RNTI) to the CRC. Alternatively, if the PDCCH is for a paging message, the BS may mask a paging indication identifier, e.g., paging-RNTI (P-RNTI) to the CRC. If the PDCCH is for system information, the BS may mask a system information identifier, e.g., system information-RNTI (SI-RNTI) to the CRC. In addition, in order to indicate a random access response that is a response for transmission of a random access preamble, the BS may mask a random access-RNTI (RA-RNTI) to the CRC, and in order to indicate a transmit power control (TPC) command for a plurality of wireless devices, the BS may mask a TPC-RNTI to the CRC.

The PDCCH which is masked by the C-RNTI carries control information for a specific wireless device (such information is called UE-specific control information), and the PDCCH masked by other RNTIs may carry common control information received by all or a plurality of wireless devices in a cell. A plurality of DCI formats can be defined to transmit the PDCCH data. This will be additionally described below.

The BS generates coded data by encoding the CRC-attached DCI (block 520). The encoding includes channel encoding and rate matching.

The BS generates modulation symbols by modulating the coded data (block 530).

The BS maps the coded data to physical resource elements (REs) (block 540). The BS may map the modulation symbols to each resource element (RE).

As described above, the control region in a subframe includes a plurality of control channel elements (CCEs). The CCE is a logical allocation basis used for providing the PDCCH with a coding rate depending on a radio channel state, and corresponds to a plurality of resource element groups (REGs). The REG includes a plurality of resource elements. One REG includes four Res, and one CCE includes nine REGs. In order to configure one PDCCH, 1, 2, 4 or 8 CCEs may be used, and the CCE aggregated as a basis of 1, 2, 4 or 8 is referred to as a CCE aggregation level.

The BS determines the number of CCEs used in transmission of the PDCCH according to a channel state. For example, a wireless device having a good downlink channel state may use one CCE in PDCCH transmission. On the other hand, a wireless device having a poor downlink channel state may use 8 CCEs in PDCCH transmission.

A control channel consisting of one or more CCEs performs interleaving on an REG basis, and may be mapped to a physical resource after performing cyclic shift based on a cell identifier (ID).

Figure 6:
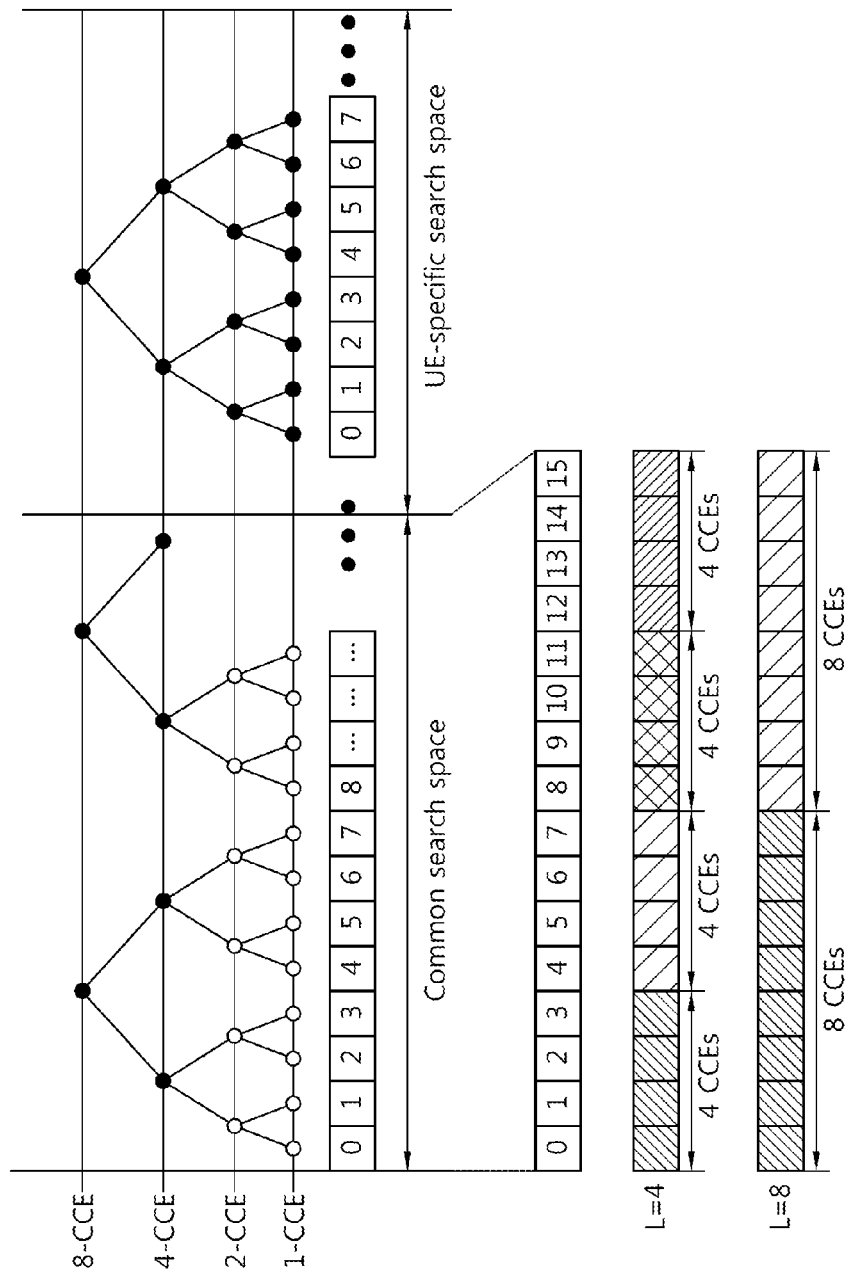
FIG. 6 is a view illustrating an example of PDCCH monitoring. For this, refer to 3GPP TS 36.213 V10.2.0 (2011-06), Ch. 9.

FIG. 6 is a view illustrating an example of monitoring PDCCH. For a PDCCH monitoring procedure, refer to 3GPP TS 36.213 V10.2.0 (2011-06), Ch. 9.

A UE can perform blind decoding for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel. The terminal is not aware of CCE aggregation level or DCI format for transmission and a position at which its PDCCH data is transmitted in a control region.

A plurality of PDCCHs may be transmitted in one sub-frame. The UE monitors a plurality of PDCCHs at every sub-frame. Here, the term "monitoring" refers to the UE attempting to perform blind decoding on a PDCCH.

In 3GPP LTE, the UE uses a search space for reducing load caused by blind decoding. The search space may be regarded as CCEs' monitoring set for searching a PDCCH. The UE monitors the PDCCH based on the search space.

The search space is divided into a common search space and a UE-specific search space. The common search space is a space for searching a PDCCH having common control information and consists of 16 CCEs, CCE index 0 to 15, and supports PDCCHs having a CCE aggregation level of {4, 8}. However, a PDCCH (DCI formats 0 and 1A) for carrying UE-specific information may be transmitted even in the common search space. The UE-specific search space supports PDCCHs having a CCE aggregation level of {1, 2, 4, 8}.

The following table 1 shows the number of PDCCH candidates that are monitored by the UE.

TABLE 1

| Type | Search space $S_k^{(L)}$ Aggregation level L | Size [in CCEs] | Number of PDCCH candidates $M^{(L)}$ | DCI Format |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of a search space is determined according to Table 1 above, and the start point of a search space is defined differently for each of the common search space and UE-specific search space. The start point of the common search space is fixed regardless of any sub-frame, but the start point of the UE-specific search space may vary per sub-frame depending on the UE identifier (e.g., C-RNTI), CCE aggregation level and/or slot number in a radio frame. In case the start point of the UE-specific search space is positioned in the common search space, the UE-specific search space and the common search space may overlap.

An aggregation of PDCCH candidates monitored by the UE may be defined on the basis of a search space. In an aggregation level 1, 2, 4 or 8, search space $S_k^{(L)}$ is defined as a set of PDCCH candidates. The CCE corresponding to PDCCH candidate m in search space $S_k^{(L)}$ is given as follows:

$$L\ \{(Y_k+m') \bmod [N_{CCE,k}/L]\}+i \qquad \text{Equation 1}$$

Here, i=0, . . . L−1, and in case the search space is the common search space, m'=m. In case the search space is a specific search space, and a carrier indicator field (CIF) is configured to the UE, m'=m+$M^{(L)}\cdot n_{CI}$, $n_{CI}$ is a value of the configured CIF. If the CIF is not configured to the UE, m'=m. Here, it is m=0, . . . , $M^{(L)}$−1 and $M^{(L)}$ is the number of the PDCCH candidates for monitoring the given search space.

In the common search space, Yk is set as 0 for two aggregation levels, L=4 and L=8. In the UE-specific search space of aggregation level L, variable Yk is defined as follows:

$$Y_k=(A\cdot Y_{k-1}) \bmod D \qquad \text{Equation 2}$$

Here, $Y_{-1}=n_{RNTI}\neq 0$, A=39827, D=65537, k=$\lfloor n_s/2 \rfloor$, and $n_s$ is a slot number in a radio frame.

When a wireless device monitors the PDCCH based on the C-RNTI, a DCI format, and a search space are determined according to a PDSCH transmission mode. Table 12 below shows an example of monitoring PDCCH in which the C-RNTI is configured.

TABLE 2

| Transmission mode | DCI format | Search Space | Transmission mode of PDSCH corresponding to PDCCH |
|---|---|---|---|
| Mode 1 | DCI format 1A | Common and UE specific | Single-antenna port, port 0 |
|  | DCI format 1 | UE specific | Single-antenna port, port 0 |
| Mode 2 | DCI format 1A | Common and UE specific | Transmit diversity |
|  | DCI format 1 | UE specific | Transmit diversity |
| Mode 3 | DCI format 1A | Common and UE specific | Transmit diversity |
|  | DCI format 2A | UE specific | Cyclic Delay Diversity(CDD) or Transmit diversity |
| Mode 4 | DCI format 1A | Common and UE specific | Transmit diversity |
|  | DCI format 2 | UE specific | Closed-loop spatial multiplexing |
| Mode 5 | DCI format 1A | Common and UE specific | Transmit diversity |
|  | DCI format 1D | UE specific | Multi-user Multiple Input Multiple Output(MU-MIMO) |
| Mode 6 | DCI format 1A | Common and UE specific | Transmit diversity |
|  | DCI format 1B | UE specific | Closed-loop spatial multiplexing |
| Mode 7 | DCI format 1A | Common and UE specific | If the number of PBCH transmit ports is one, single-antenna port, port 0 is used, otherwise Transmit diversity |

TABLE 2-continued

| Transmission mode | DCI format | Search Space | Transmission mode of PDSCH corresponding to PDCCH |
|---|---|---|---|
| | DCI format 1 | UE specific | Single-antenna port, port 5 |
| Mode 8 | DCI format 1A | Common and UE specific | If the number of PBCH transmit ports is one, single-antenna port, port 0 is used, otherwise Transmit diversity |
| | DCI format 2B | UE specific | Dual layer transmit, port 7 or 8 or single-antenna port, port 7 or 8 |

Uses of DCI formats can be classified as shown in the following table.

TABLE 3

| DCI format | Description |
|---|---|
| DCI format 0 | used for the scheduling of PUSCH |
| DCI format 1 | used for the scheduling of PDSCH codeword |
| DCI format 1A | used for the compact scheduling of one PDSCH codeword and random access procedure |
| DCI format 1B | used for the compact scheduling of one PDSCH codeword with precoding information |
| DCI format 1C | used for the compact scheduling of one PDSCH codeword |
| DCI format 1D | used for the compact scheduling of one PDSCH codeword with precoding and power offset information |
| DCI format 2 | used for the scheduling PDSCH to UEs configured in closed-loop spatial multiplexing mode |
| DCI format 2A | used for the scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustment |

DCI formats and search spaces to be used may be differently determined depending on RNTI masked to CRC which has been used for generating DCI. Table 4 below represents DCI formats and search spaces of a control channel in case that SI-RNTI, P-RNTI or RA-RNTI is masked to the CRC of the DCI.

TABLE 4

| DCI format | Search space | Transmission mode of PDSCH corresponding to PDCCH |
|---|---|---|
| DCI format 1C | Common | If the number of PBCH transmit ports is one, single-antenna port, port 0 is used, otherwise Transmit diversity |
| DCI format 1A | Common | If the number of PBCH transmit ports is one, single-antenna port, port 0 is used, otherwise Transmit diversity |

Table 5 below shows DCI formats and search spaces of a control channel in case that SPS-C-RNT is masked to the CRC of the DCI

TABLE 5

| Transmission mode | DCI format | Search space | Transmission mode of PDSCH corresponding to PDCCH |
|---|---|---|---|
| Mode 1 | DCI format 1A | Common and UE specific | Single antenna port, port 0 |
| | DCI format 1 | UE specific | Single antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Transmit diversity |
| Mode 4 | DCI format 1A | Common and UE specific | Transmit diversity |
| | DCI format 2 | UE specific | Transmit diversity |
| Mode 5 | DCI format 1A | Common and UE specific | Transmit diversity |
| Mode 6 | DCI format 1A | Common and UE specific | Transmit diversity |
| Mode 7 | DCI format 1A | Common and UE specific | Single antenna port 5 |
| | DCI format 1 | UE specific | Single antenna port 5 |
| Mode 8 | DCI format 1A | Common and UE specific | Single antenna port 7 |
| | DCI format 2B | UE specific | Single antenna port 7 or 8 |
| Mode 9 | DCI format 1A | Common and UE specific | Single antenna port 7 |
| | DCI format 2C | UE specific | Single antenna port 7 or 8 |
| Mode 10 | DCI format 1A | Common and UE specific | Single antenna port 7 |
| | DCI format 2D | UE specific | Single antenna port 7 or 8 |

Table 6 below shows search spaces and DCI formats used in case that temporary C-RNTI is masked to the CRC of the DCI.

TABLE 6

| DCI format | Search space | Transmission mode of PDSCH corresponding to PDCCH |
|---|---|---|
| DCI format 1A | Common and UE specific | If the number of PBCH transmit ports is one, single-antenna port, port 0 is used, otherwise Transmit diversity |
| DCI format 1 | Common and UE specific | If the number of PBCH transmit ports is one, single-antenna port, port 0 is used, otherwise Transmit diversity |

Figure 7:
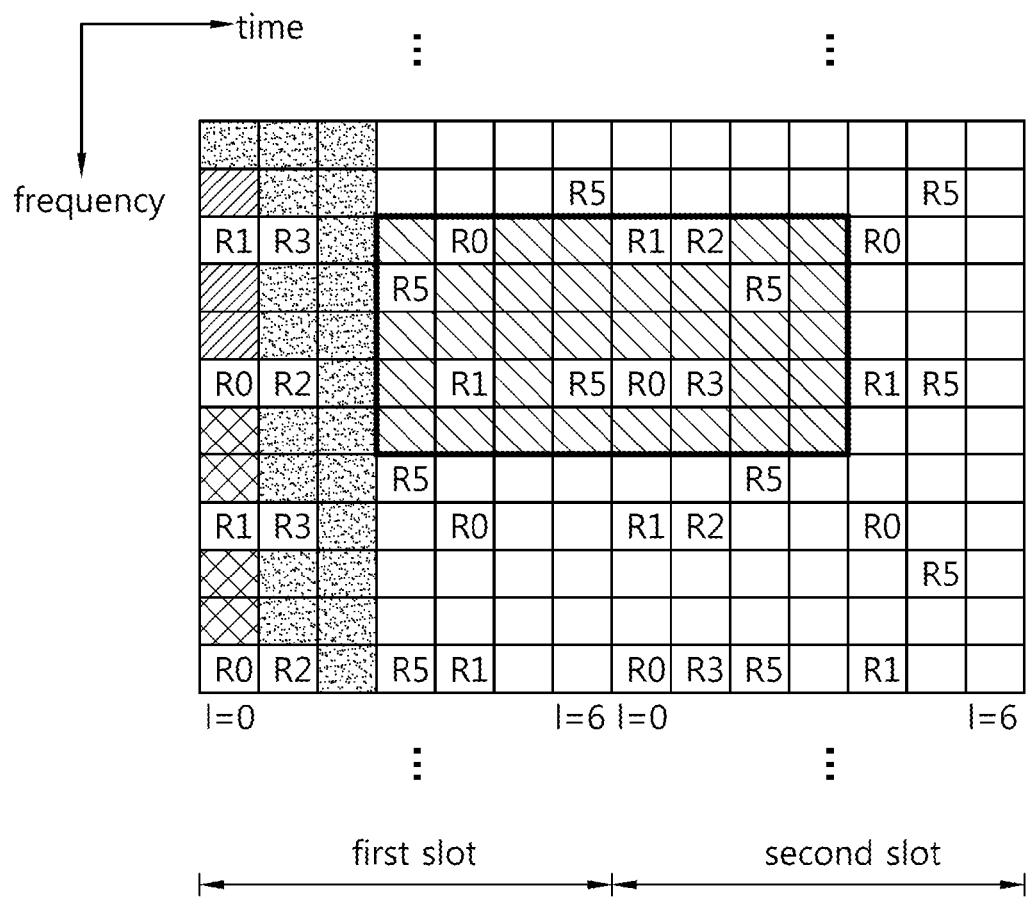
FIG. 7 illustrates a downlink sub-frame allocated with a control channel and a 3GPP LTE reference signal.

FIG. 7 shows an example of a downlink subframe in which a reference signal and a control channel in 3GPP LTE are allocated.

A downlink subframe may be classified into a control region and a data region. For example, in the downlink subframe, the control region (or a PDCCH region) includes front three OFDM symbols and the data region in which PDSCH is transmitted includes remaining OFDM symbols.

In the control region, a PCFICH, a PHICH and/or the PDCCH are transmitted.

The physical HARQ ACK/NACK indicator channel (PHICH) may transmit a hybrid automatic retransmission request (HARQ) information as a response to a uplink transmission.

The physical control format indicator channel (PCFICH) may transmit the information of the number of OFDM symbols allocated to the PDCCH. For example, a control format indicator (CFI) of the PCFICH may indicate three OFDM symbols. The region excluding the resource through which the PCFICH and/or the PHICH is transmitted is the PDCCH region that a wireless device monitors the PDCCH.

In the subframe, various reference signals may be transmitted as well.

A cell-specific reference signal reference signal (CRS) is a reference signal that all wireless devices in a cell may receive, and may be transmitted over the whole downlink frequency band. In FIG. 6, 'R0' denotes an RE (resource element) where a CRS for a first antenna port is transmitted, 'R1' which is an RE where a CRS for a second antenna port is transmitted, 'R2' which is an RE where a CRS for a third antenna port is transmitted, and 'R3' which is an RE where a CRS for a fourth antenna port is transmitted.

The RS sequence $r_{l,n_s}(m)$ for CRS is defined as follows.

$$r_{l,n_s}(m) = \frac{1}{\sqrt{2}}(1 - 2 \cdot c(2m)) + j\frac{1}{\sqrt{2}}(1 - 2 \cdot c(2m+1)) \qquad \text{<Equation 3>}$$

Herein, $m=0,1, \ldots, 2N_{RB}^{max,DL}-1$, $N_{RB}^{max,DL}$ is the maximum number of RBs, ns is a slot number in a radio frame, and l is an OFDM symbol index in a slot.

A pseudo-random sequence, c(i), is defined by a gold sequence whose length is 31, as follows.

$$c(n) = (x_1(n+N_c) + x_2(n+N_c)) \mod 2$$

$$x_1(n+31) = (x_1(n+3) + x_1(n)) \mod 2$$

$$x_2(n+31) = (x_2(n+3) + x_2(n+2) + x_2(n+1) + x_2(n)) \mod 2 \qquad \text{<Equation 4>}$$

Herein, Nc=1600, and the first m-sequence is initialized as $x_1(0)=1$, $x_1(n)=0$, $n=1,2, \ldots, 30$. The second m-sequence is initialized as $c_{init}=2^{10} \cdot (7 \cdot (n_s+1)+l+1) \cdot (2 \cdot N_{ID}^{cell}+1)+2 \cdot N_{ID}^{cell}+N_{CP}$ at the beginning of each OFDM symbol. $N_{ID}^{cell}$ is a physical cell identity (PCI) of the cell, and $N_{CP}=1$ in case of the normal CP, and $N_{CP}=0$ in case of the extended CP.

Also, a UE-specific reference signal (URS) may be transmitted in a subframe. Although the CRS is transmitted in the entire region of a subframe, the URS is transmitted in the data region of the sub-frame, and is a reference signal used for demodulating the PDSCH. In FIG. 7, 'R5' denotes an RE where the URS is transmitted. A DM-RS is a reference signal used for demodulating the EPDCCH data.

The URS may be transmitted in an RB in which the corresponding PDSCH data is mapped. Although in FIG. 7, R5 is denoted outside the area in which the PDSCH is transmitted, this is merely to indicate the position of the RE to which the URS is mapped.

The URS is may be a reference signal which is demodulated only by a specific wireless device. The RS sequence $r_{l,n_s}(m)$ for the URS is the same as Equation 3. At this time, $m=0,1, \ldots, 12N_{RB}^{PDSCH}-1$ and $N_{RB}^{PDSCH}$ is the number of RBs which is used for the corresponding PDSCH transmission. In case that the URS is transmitted through a single antenna, the pseudo-random sequence generator is initialized as $c_{init}=(\lfloor n_s/2 \rfloor+1) \cdot (2N_{ID}^{cell}+1) \cdot 2^{16}+n_{RNTI}$ at the start of each subframe. $n_{RNTI}$ is an identifier of a wireless device.

The above-described initializing method is associated with the case where the URS is transmitted through a single antenna. When the URS is transmitted through a multi-antenna, the pseudo-random sequence generator is initialized as $c_{init}=(\lfloor n_s/2 \rfloor+1) \cdot (2n_{ID}^{(nSCID)}+1) \cdot 2^{16}+n_{SCID}$ at the start of each sub-frame. $n_{SCID}$ is a parameter that is acquired from a DL grant (for example, DCI format 2B or 2C) related with PDSCH transmission.

The URS supports multiple input multiple output (MIMO) transmission. Depending on an antenna port or layer, the RS sequence for the URS may be spread to the spread sequence as follows.

TABLE 7

| Layer | [w(0), w(1), w(2), w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path inputted to a pre coder. A rank is the number of non-zero eigenvalue in the MIMO channel matrix, and is the same as the number of layer or space stream. The layer may correspond to an antenna port that distinguishes the URS and/or a spread sequence which is applied to the URS.

Meanwhile, the PDCCH is monitored in a restricted region such as a control region in a subframe, and the CRS transmitted from whole bands is used for demodulating the PDCCH. As the sort of control data becomes diverse and an amount of the control data is increased, a flexibility of scheduling becomes deteriorated with the existing PDCCH only. Also, in order to decrease overhead owing to the CRS transmission, an enhanced PDCCH (EPDCCH) is introduced.

Figure 8:
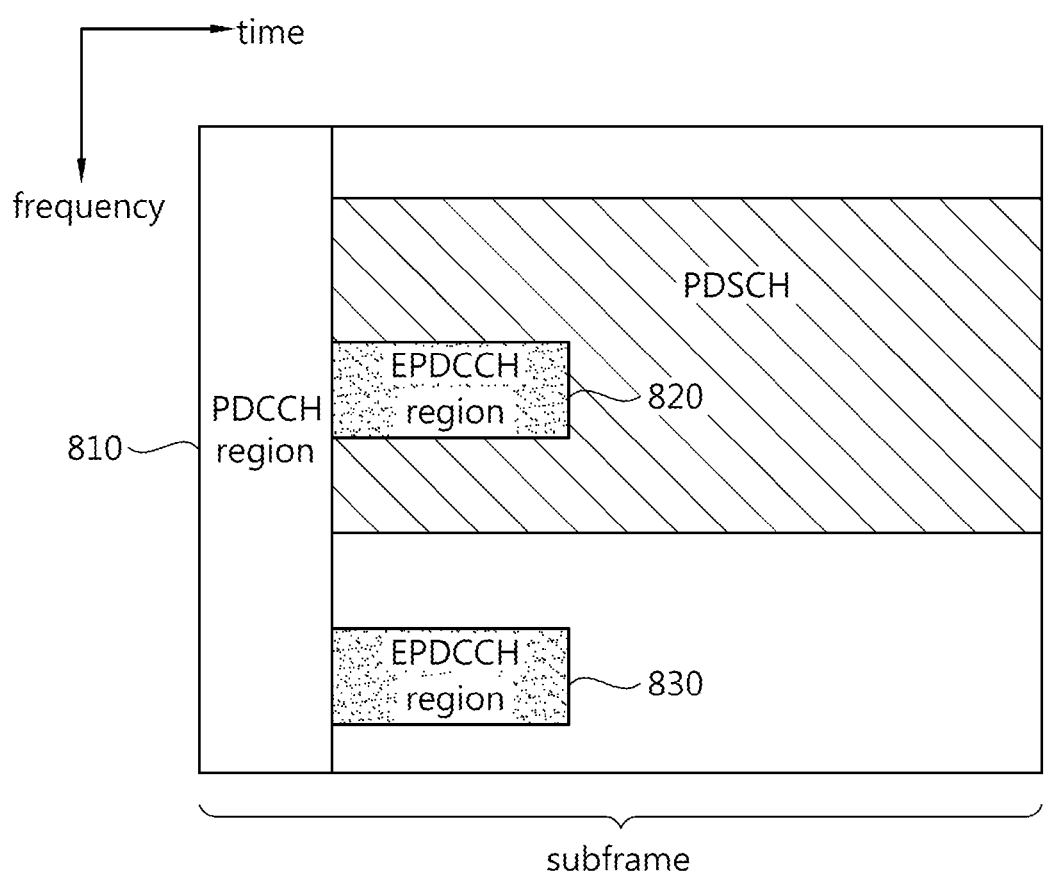
FIG. 8 illustrates an exemplary sub-frame having an ePDCCH.

FIG. 8 is a view illustrating an exemplary subframe with EPDCCH.

The subframe may include 0 or 1 PDCCH region 810 and 0 or more EPDCCH regions 820 and 830.

The EPDCCH regions 820 and 830 are regions where a UE monitors EPDCCH. The PDCCH region 810 is located in preceding 3 or up to 4 OFDM symbols of a subframe, and The EPDCCH regions 820 and 830 may be flexibly scheduled in the OFDM symbols, following the PDCCH region 810.

One or more EPDCCH regions 820 and 830 may be assigned to the UE. The UE may monitor EPDCCH data in the EPDCCH regions 820 and 830 assigned to the UE.

A base station may notify the UE of information on a subframe for monitoring the EPDCCH and/or the number/position/size of the EPDCCH regions 820 and 830 through a radio resource control (RRC) message, and the like.

In the PDCCH region 810, the PDCCH can be demodulated based on CRS. In the EPDCCH regions 820 and 830, DM-RS may be defined rather than CRS for demodulation. The DM-RS may be transmitted in the corresponding EPDCCH regions 820 and 830.

A RS sequence for the DM-RS is expressed in Equation 3. Here, $m=0,1, \ldots, 12N_{RB}^{max,DL}-1$ and $N_{RB}^{max,DL}$ is the maximum number of RBs. A pseudo-random sequence generator can be initialized as $c_{init}=(\lfloor n_s/2 \rfloor+1) \cdot (2n_{ID,i}^{EPDCCH}+1) \cdot 2^{16}+n_{SCID}^{EPDCCH}$ at the start of each subframe. ns is the number of a slot in a radio frame, $n_{ID}$, $n_{ID}^{EPDCCH}$ is a cell index related to the corresponding EPDCCH region, and $n_{SCID}^{EPDCCH}$ is a parameter given from higher-layer signaling.

Each of the EPDCCH regions 820 and 830 may be used in scheduling for different cells. For example, EPDCCH within the EPCCH region 820 can deliver information on scheduling for a primary cell, and EPDCCH within the EPCCH region 830 can send information on scheduling for a secondary cell.

When the EPDCCH is transmitted via multiple antenna in the EPDCCH regions 820 and 830, the same precoding as that of the EPDCCH may be applied to DM-RS in EPDCCH regions 820 and 830.

Considering that the PDCCH uses CCE as a transmission resource unit, a transmission resource unit for the EPDCCH is referred to as Enhanced Control Channel Element (ECCE), An aggregation level may be defined as a resource unit for monitoring the EPDCCH. For example, assuming that 1 ECCE is a minimum resource for the EPDCCH, an aggregation level may be L={1, 2, 4, 8, 16}. A search space may be defined even in the EPDCCH region. The UE can monitor EPDCCH candidates on the basis of the aggregation level.

Figure 9:
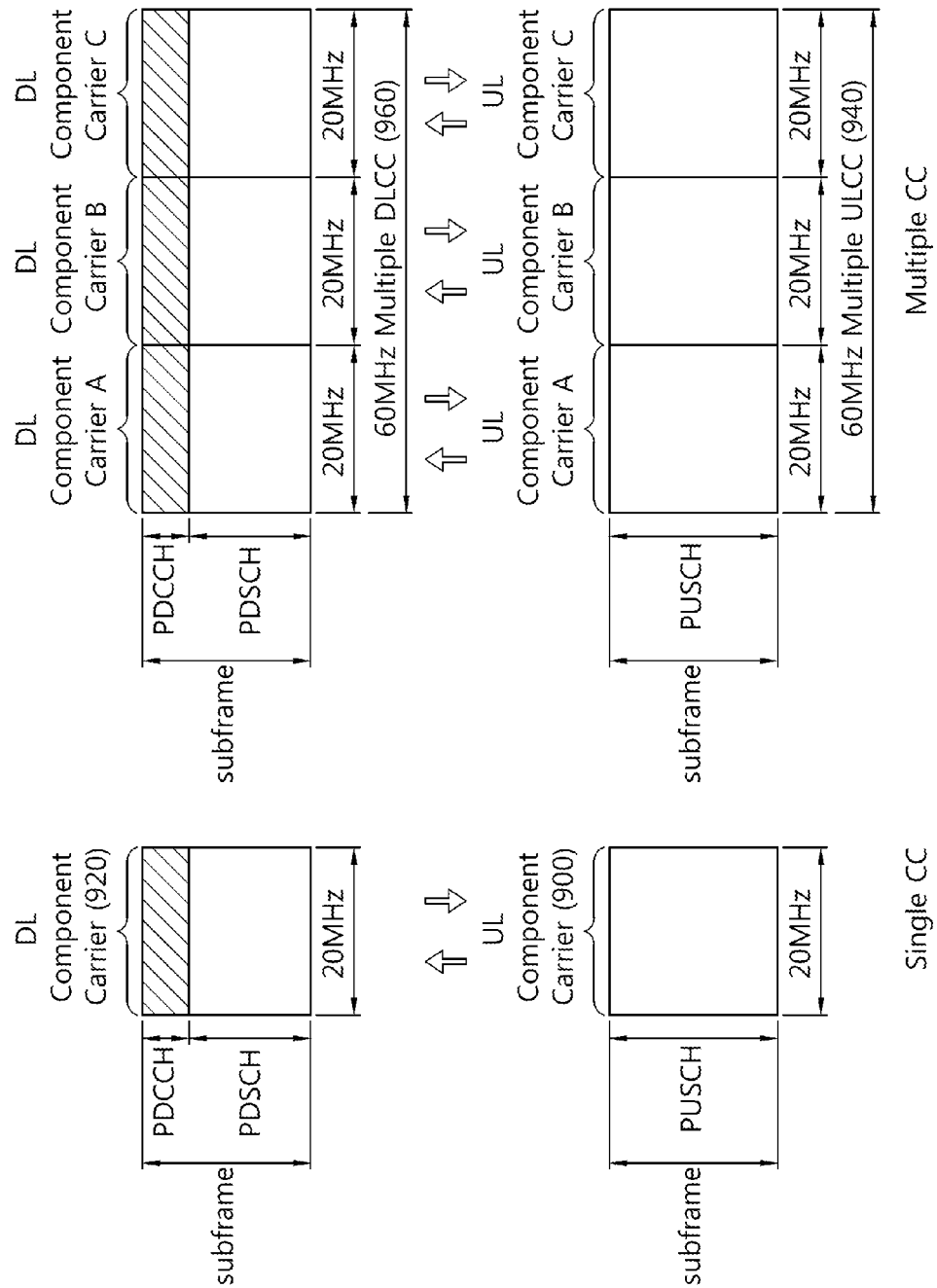
FIGS. 9(A) and 9(B) are concept views illustrating carrier aggregation.

FIG. 9 is a conceptual diagram showing a carrier aggregation.

FIG. 9(A) shows a single component carrier (CC). A single CC may correspond to an uplink frequency band 900 and a downlink frequency band 920 of 20 MHz. FIG. 9(B) shows multiple CCs. For example, the multiple CC may correspond to an uplink frequency band 940 and a downlink frequency band 960 of 60 MHz in which the uplink frequency band and the downlink frequency band of 20 MHz are aggregated.

A BS may transmit data to a wireless device through the plurality of downlink CCs by performing a carrier aggregation. The BS may perform a downlink transmission using N downlink CCs. In this time, if a wireless device may receive downlink data through only M (M is a natural number smaller than or equal to N) downlink CCs, the wireless device may receive the downlink data which are transmitted through only the M downlink CCs from the BS.

Additionally, a BS may set a frequency bandwidth that corresponds to L (L is a natural number smaller than or equal to M and N) downlink CCs as a main CC and operate the frequency bandwidth. The wireless device may preferentially monitor and receive the data that the BS transmits through a main CC. In case of performing the carrier aggregation, a CC may be distinguished according to a cell.

In case of performing the carrier aggregation using the CC of a primary cell (P-cell) and the CC of a secondary cell (S-cell), a carrier that corresponds to the CC of a P-cell among the carriers used in downlink and uplink is called a primary cell component carrier (PCC) and a carrier that corresponds to the CC of S-cell is called a second cell component carrier (SCC).

Figure 10:
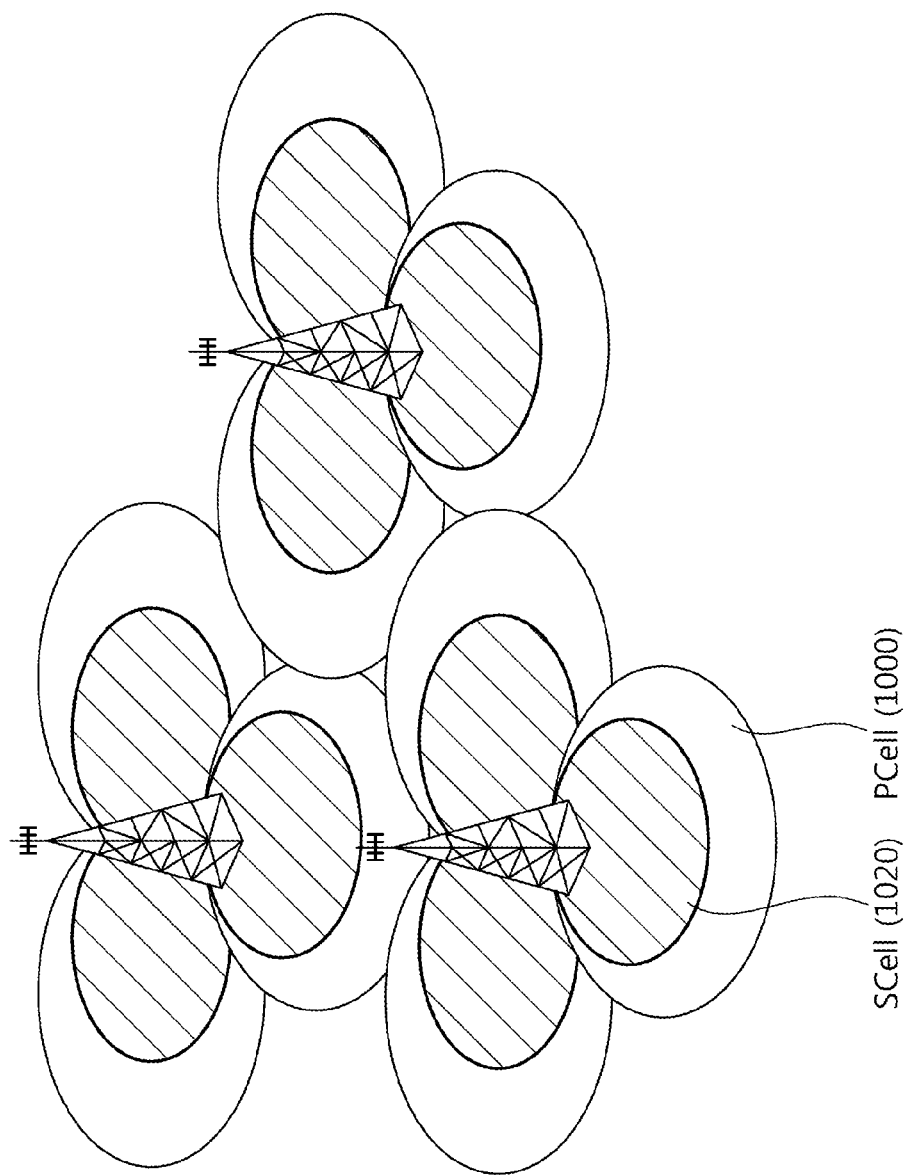
FIG. 10 is a concept view illustrating a P-cell and an S-cell.

FIG. 10 is a conceptual diagram showing the P-cell and the S-cell.

Referring to FIG. 10, a BS may perform a carrier aggregation based on the PCC of a P-cell 1000 and the SCC of one or more S-cell 1020. In case that two or more cells exist, the BS may determine one cell to be the P-cell 1000 and other cells to be S-cell 1020. The BS may aggregate the CCs of the determined P-cell 1000 and the S-cell 1020, and transmit data to a wireless device using an aggregated frequency bandwidth. The wireless device may also transmit data to the BS using the aggregated frequency bandwidth. As an exemplary case among the scenarios in which the P-cell 1000 and the S-cell 1010 are deployed, the P-cell and the S-cell 1020 shown in FIG. 10 shows the case that a transmission range of the data transmitted based on the PCC of the P-cell 1000 is greater than a transmission range of the data transmitted based on the SCC of the S-cell 1020.

The wireless device may perform the radio resource control (RRC) connection through the PCC of the P-cell 1000. Furthermore, the wireless device may attempt to perform a random access to the BS through a physical random access channel (PRACH) based on a signal signaled through the PCC. That is, the wireless device may perform an initial connection establishment process or a connection re-establishment process to the BS through the PCC in the carrier aggregation environment.

The SCC of the S-cell 1020 may be used for providing additional radio resources. In order to perform the carrier aggregation that adds the SCC to the PCC, the wireless device should perform a neighbor cell measurement that the wireless device acquires the information of neighboring cells. Based on the neighbor cell measurement performed by the wireless device, the BS may determine whether to aggregate the SCC into the PCC. For example, in the P-cell, a legacy subframe may be transmitted through the PCC, and in the S-cell, a NCT subframe which will be described below may be transmitted through the SCC. The legacy subframe may be a subframe used for being distinguished from the subframe defined prior to 3GPP LTE-A release 11 or the NTC subframe newly defined in 3GPP LTE-A release 12.

In case that the legacy subframe is transmitted through the PCC in the P-cell 1000, and the NCT subframe which will be described below is transmitted through the SCC in the S-cell 1020, the resource allocation information for the resources transmitted in the NCT subframe may be transmitted based on a control channel included in the legacy subframe. That is, a cross carrier scheduling in order for the PDCCH of one CC to transmit data information of other CCs may be used. In case that the cross carrier scheduling is applied, the DCI related to the PDSCH which is transmitted in the S-cell may be transmitted through the PDCCH of the P-cell to prevent an interference on the PDCCH. Accordingly, the cross carrier scheduling can limit the PDCCH capacity for a macro cell.

The BS may transmit the PDCCH data to the wireless device through the PCC. The PDCCH data may include allocation information for the PDSCH data which are transmitted through the downlink PCC band and the SCC band and information for approving data transmission through the uplink.

The P-cell 1000 and the S-cell 1020 may perform the carrier aggregation through a configuration and an activation operation, and transmit or receive data through an aggregated frequency band.

Figure 11:
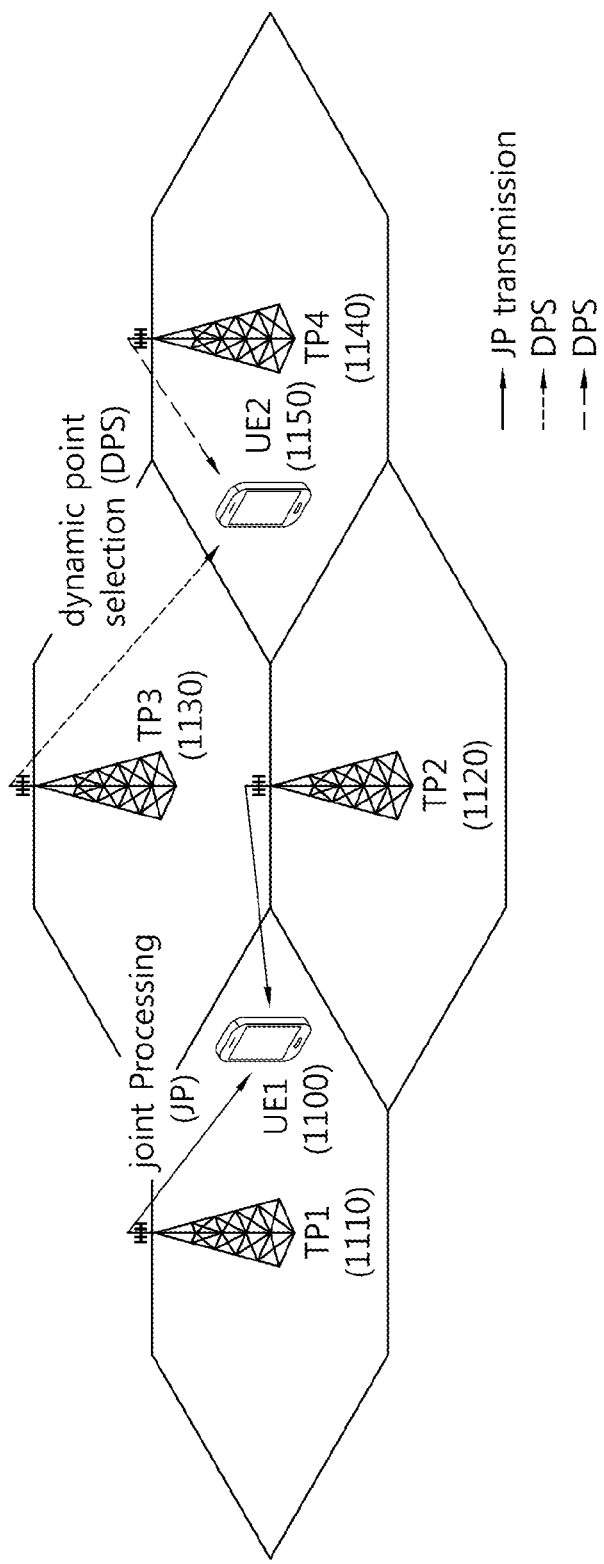
FIG. 11 is a concept view illustrating a method of transmitting data from a plurality of transmission points to a terminal based on CoMP (coordinated multi-point).

FIG. 11 is a conceptual diagram showing a method of transmitting data to a wireless device based on a coordinated multi points (CoMP) in a plurality of transmission points.

Referring FIG. 11, traffic data and control data may be transmitted to a wireless device based on a CoMP at a plurality of transmission points. The plurality of transmission points may generate data which are transmitted to a wireless device within a cell based on a cell ID which is identical or different. The plurality of transmission points may be called a plurality of serving cells or cells in other terminology, and the CoMP may transmit or receive data based on serving cells which are different from each other.

A method is shown that a first transmission point 1110 and a second transmission point 1120 transmit data to a wireless device using a joint transmission (JT) method of the CoMP. In case that the plurality of transmission points 1110 and 1120 transmit data to the wireless device 1100 using the JT method, the same data may be transmitted to the wireless device 1100 from different transmission points 1110 and 1120. The wireless device 1100 may receive and demodulate the data transmitted from different transmission points 1110 and 1120.

A third transmission point 1130 and a fourth transmission point 1140 may transmit data to a wireless device 1150 using a dynamic point selection (DPS) method of the CoMP.

In the DPS method, the wireless device may receive data by dynamically selecting a transmission point having a better channel from the transmission points 1130 and 1140 different from each other. For example, when transmitting EPDCCH data to the wireless device 1150 from the third transmission point 1130 on a first time, EPDCCH data may be transmitted to the wireless device 1150 from the fourth transmission point 1140 on a second time.

Figure 12:
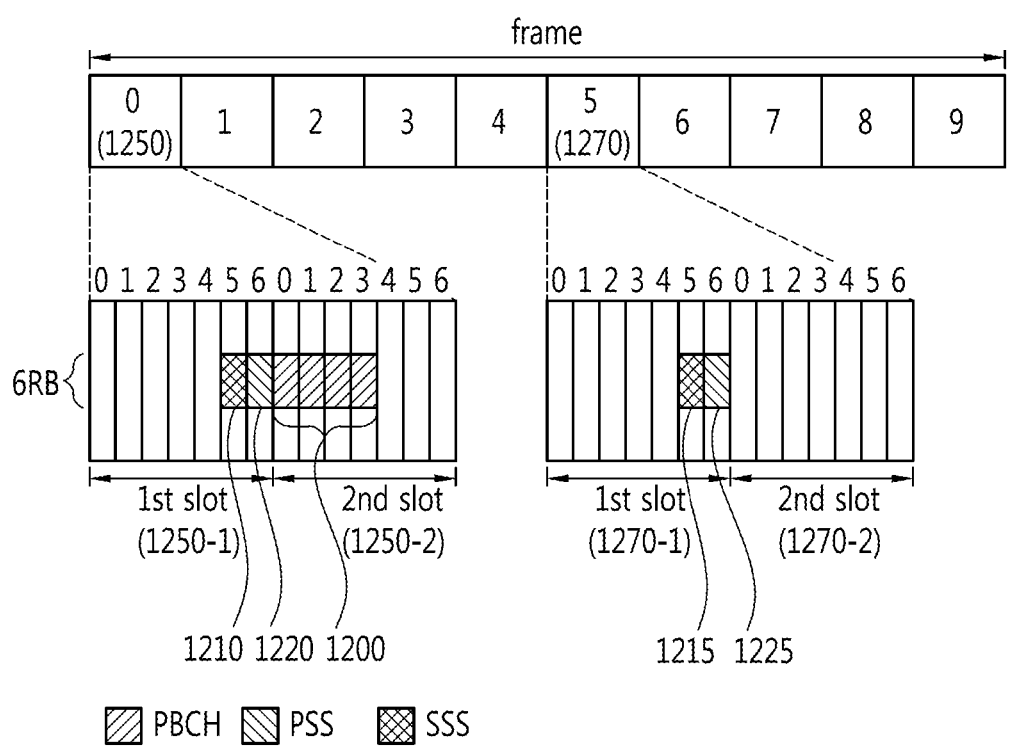
FIG. 12 illustrates an example of transmission of a synchronization signal and PBCH data in a legacy sub-frame when using FDD (frequency division duplex as a duplexing scheme.

FIG. 12 shows a transmission of a synchronization signal and PBCH data in a legacy subframe when Frequency Division Duplexing (FDD) is used in according to a duplexing method.

A physical broadcast channel (PBCH) 1200 is transmitted in former four OFDM symbols in a second slot 1250-2 in the first subframe (i.e., subframe 1250 having an index is 0) of a radio frame. The PBCH 1200 carries system information essential for a wireless device to communicate with a BS, and system information transmitted through the PBCH 1200 is called a master information block (MIB). In contrast, system information transmitted on a PDSCH that is indicated by a PDCCH is called a system information block (SIB).

Seventh OFDM symbols (i.e., OFDM symbol having an index 6), from among OFDM symbols allocated to the first slots 1250-1 and 1270-1 of the first subframe (i.e., subframe 1250 having an index 0) and a seventh subframe (i.e., subframe 1270 having an index 5), may include respective primary synchronization signals (PSSs) 1220 and 1225. The PSSs 1220 and 1225 may be used for acquiring OFDM symbol synchronization or slot synchronization. Furthermore, the information of a physical cell ID may be acquired through the PSSs 1220 and 1225. A primary synchronization code (PSC) is a sequence which is used for generating the PSSs 1220 and 1225. The PSS may be generated by defining a plurality of PSCs in 3GPP LTE. A BS may generate the PSSs 1220 and 1225 using one of 3 PSCs based on a cell ID. A wireless device may acquire the information of the cell ID based on the PSC by receiving the PSSs 1220 and 1225.

Seventh OFDM symbols (i.e., OFDM symbol having an index 6), from among OFDM symbols allocated to the first slots 1250-1 and 1270-1 of the first subframe (i.e., subframe 1250 having an index 0) and a seventh subframe (i.e., subframe 1270 having an index 5), may include secondary synchronization signals (SSSs) 1210 and 1215.

The first SSS 1210 may be transmitted through sixth OFDM symbol in the first slot 1250-1 of the first subframe 1250 and the second SSS 1225 may be transmitted through sixth OFDM symbol in the first slot 1270-1 of the sixth subframe 1270. The SSSs 1210 and 1215 may be used for obtain frame synchronization. The SSSs 1210 and 1215 are used for acquiring information of a cell ID together with the PSSs 1210 and 1215.

The first SSS 1210 and the second SSS 1215 may be generated using different secondary synchronization codes (SSCs). When each of the first SSS 1210 and the second SSS 1215 includes 31 subcarriers, each of the two SSC sequences whose length is 31 is used for the first SSS 1210 and the second SSS 1215.

From a viewpoint of a frequency domain, the PBCH 1200, the PSSs 1210 and 1220, and the SSSs 1215 and 1225 are transmitted within a frequency bandwidth that corresponds to 6 RBs on the basis of a center frequency of the subframe.

A new format of sub-frame may be defined and used in the new LTE-A release. The newly defined sub-frame may be defined as an NCT sub-frame (new carrier sub-frame). The NCT sub-frame may be specifically defined as follows.

In the existing LTE release 8/9/10 systems, control channels, such as CRSs, PSSs/SSSs, PDCCHs, and PBCHs, reference signals, and synchronization signals may be transmitted through downlink carriers. The sub-frames defining such control channels, reference signals, and synchronization signals may be referred to as legacy sub-frames. In post-LTE release 8/9/10 systems, some of the channels or signals that used to be sent in existing legacy sub-frames might not be subjected to transmission in order for reduced interference between a plurality of cells and better carrier expandability. Such sub-frames may be defined as extension carrier sub-frames or NCT sub-frames. For example, the NCT sub-frames might not contain reference signal information and/or control channels such as PDCCH data and CRSs. For example, in case an NCT sub-frame contains no PDCCH, control information may be transmitted through an ePDCCH. The PDSCH of an NCT sub-frame may be allocated based on the ePDCCH included in the NCT sub-frame.

For example, assume that a legacy sub-frame and an NCT sub-frame both are transmitted from multiple transmission points (TPs) based on CoMP. In such case, the PDCCH included in the legacy sub-frame may also contain the information regarding allocation of a PDSCH that is transmitted through the NCT sub-frame. The NCT sub-frame may transmit downlink control information such as a DCI through the ePDCCH. Since no CRS is transmitted in the NCT sub-frame, the DCI may be demodulated based on a reference signal such as a DM-RS. One sub-frame that has undergone configuration of an NCT sub-frame and a legacy sub-frame in the TDM (time division multiplexing) scheme may also be referred to as an NCT sub-frame. For example, in case a sub-frame includes a slot generated through channel and signal configuration of an NCT sub-frame and another slot generated through channel and signal configuration of a legacy sub-frame, the sub-frame may be denoted an NCT sub-frame. Further, an NCT sub-frame and a legacy sub-frame may be transmitted in one frame that is temporally divided in the TDM scheme. For example, a frame transmitted in one cell may contain both an NCT sub-frame and a legacy sub-frame, and such frame may be called an NCT frame as well.

Assuming a P-cell transmitting data based on a legacy sub-frame and an S-cell transmitting data using an NCT sub-frame, data may be transmitted to the terminal based on the P-cell and the S-cell. In other words, the NCT sub-frame may be a sub-frame transmitted in an SCC that is a frequency band allocated to an S-cell. When transmitting data to the terminal based on the P-cell and the S-cell, the base station may inform the S-cell of the position of the OFDM symbol where the PDSCH starts in the legacy sub-frame through higher layer signaling. The parameter indicating the position of the OFDM symbol where the PDSCH starts in the legacy sub-frame is denoted ldatastart parameter. The ldatastart parameter may have a value in a range from 1 to 4.

The NCT frame may include ten NCT sub-frames. The NCT frame may transmit a reference signal for performing time/frequency tracking through specific sub-frames only, not all the sub-frames therein. The reference signal for performing time/frequency tracking, included and transmitted in the NCT sub-frame, may be referred to as a TRS (tracking reference signal). Instead of the term "TRS," the term "eSS (enhanced synchronization signal)" or "reduced CRS" may be used to denote the reference signal for performing time/frequency tracking, which is transmitted over the NCT sub-frame. The TRS may be transmitted in specific sub-frames (e.g., sub-frame 0 and sub-frame 5) of one NCT frame. The TRS may be a reference signal defined to be transmitted in a specific RE of a specific RB in an NCT sub-frame.

The TRS-configured RE in the NCT sub-frame may be transmitted without mapped with PDSCH data. That is, in the NCT sub-frame, data rate matching for PDSCH data may be conducted considering the TRS-configured RE. Another NCT sub-frame may be a sub-frame of a type in which a TRS-configured RE has been punctured.

An antenna port for transmitting a TRS may be defined as antenna port x. In case the base station transmits the TRS based on antenna port x, the base station might not map PDSCH or ePDCCH data to the RE corresponding to antenna port x.

The initial value of pseudo random sequence used to generate a TRS may be determined based on $c_{init}=2^{10} \cdot (7 \cdot (n_s+1)+l+1) \cdot (2 \cdot N_{ID}^{cell}+1)+2 \cdot N_{ID}^{cell}+N_{CP}$. Here, $n_s$ may be a slot number, l an OFDM symbol number, $N_{ID}^{cell}$ a cell identifier, and $N_{CP}$ the length of the CP. Depending on the type of CP, $N_{CP}$ may have different values.

v-shift may be used as a parameter to reduce inter-cell interference. v-shift may be used as a parameter to adjust the position of the RE mapped with a TRS. For example, v-shift may be determined based on $v_{shift}=N_{ID}^{cell} \mod 6$. v-shift may be a fixed value, e.g., 0.

Figure 13:
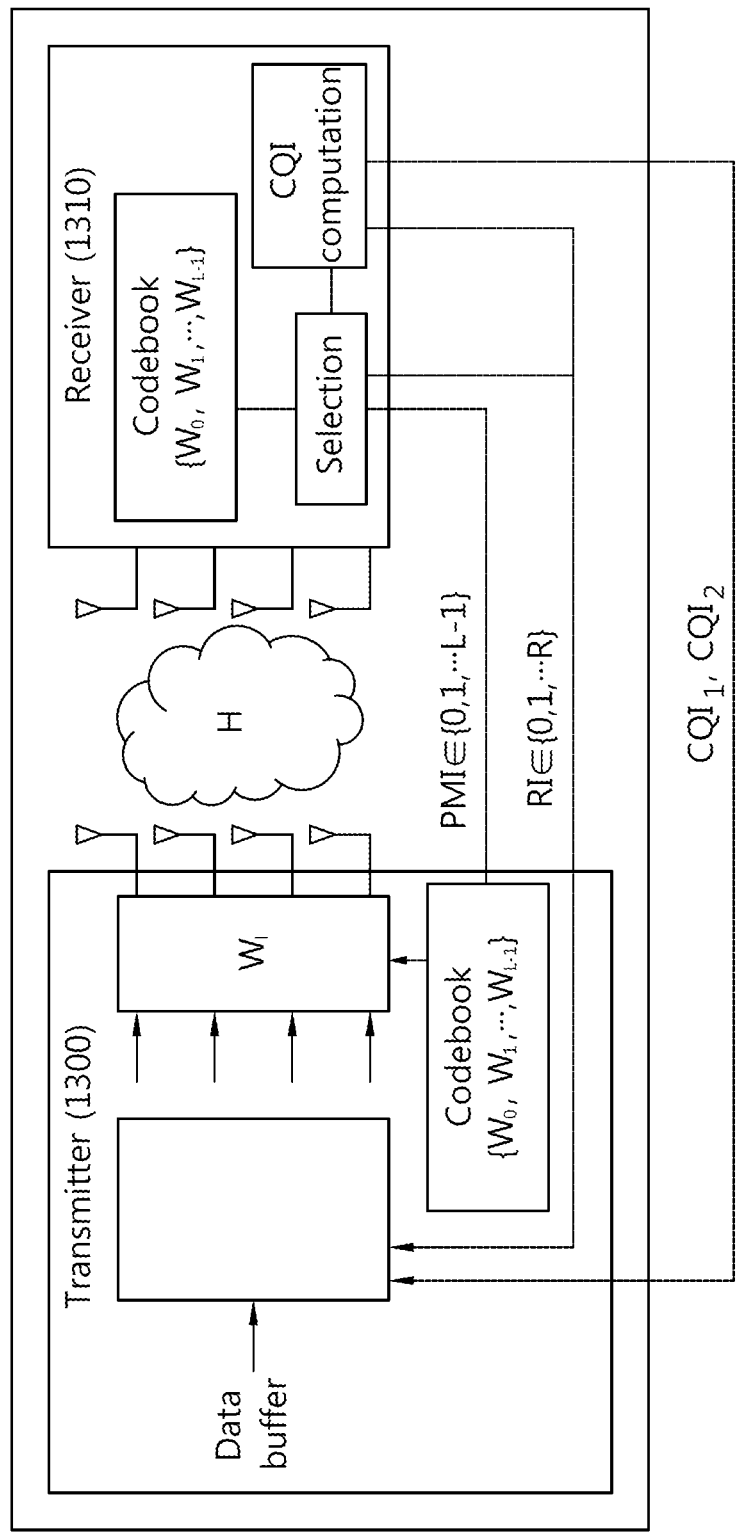
FIG. 13 is a concept view illustrating transmission of a CSI-RS and a CSI feedback measured by a terminal.

FIG. 13 is a concept view illustrating transmission of a CSI-RS and a CSI feedback measured by a terminal Referring to FIG. 13, the terminal 1310 may feed back to the base station 1300 channel information produced based on a CSI-RS transmitted from the base station 1300 using parameters such as an RI (rank index), a PMI (precoding matrix index), or a CQI (channel quality indicator). The parameters indicating channel information, such as an RI, a PMI, or a CQI, may be denoted CSI (channel state information) feedback information. Each type of CSI feedback information may play a role as follows:

(1) RI (rank index) may contain information on a transmission rank. In other words, information on the number of layers used for downlink transmission may be provided to the base station based on the RI.

(2) PMI (precoding matrix index) may contain information on a precoding matrix used for downlink transmission.

(3) CQI (channel-quality indication) may contain information on an MCS (modulation and coding scheme).

The terminal 1310 may report information on the downlink channel state by transmitting the RI, PMI, CQI or other information indicating the channel state, as the feedback information for the CSI-RS transmitted from the base station 1300.

The CRS is also a reference signal that may be used for the terminal to obtain downlink channel state information. Accordingly, the CRS may overlap, in role, the CSI-RS. The CSI-RS may be used to supplement the CRS, an existing reference signal. As the number of transmit antennas increases, the CSI-RS may be used to determine better the channel state information than the existing reference signal, CRS. The existing CRS density was set high in order to enable channel measurement in the very quickly varying channel environment. Accordingly, the CRS operates as a high overhead. In contrast, the CSI-RS is a reference signal used only to obtain CSI, and thus, the CSI-RS has low time-frequency density. Accordingly, the CSI-RS has a lower overhead than the CRS. Therefore, as a new type of reference signal, rather than extensions to the existing reference signal, CRS, the CSI-RS having low time-frequency density and low overhead may be defined and used.

One cell or base station may include one, two, four, or eight CSI-RSs for each resource block pair, and may transmit the same to the terminal. A CSI-RS configuration is a deployment of CSI-RSs in a resource grind, and there may be different CSI-RS configurations depending on the number of CSI-RSs used in one cell.

Figure 14:
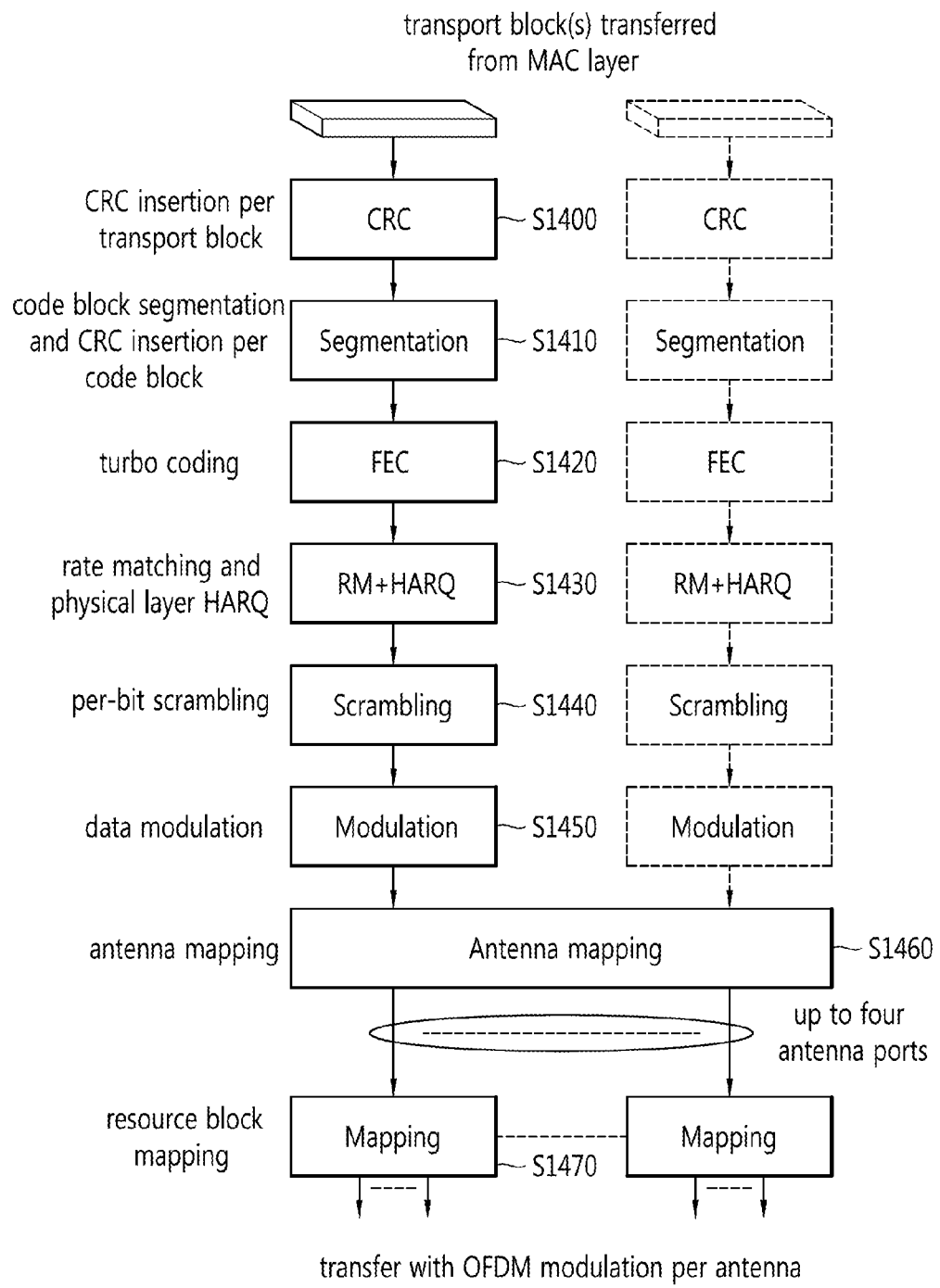
FIG. 14 is a concept view illustrating a downlink transport channel processing method according to an embodiment of the present invention.

FIG. 14 is a concept view illustrating a downlink transport channel processing method.

FIG. 14 illustrates an operation in which a transport block is transmitted via a transport channel to a physical layer.

An LTE physical layer interfaces with its higher layer, an MAC layer, by way of a transport channel. In the case of single antenna transmission, there is a dynamically-sized transport block per TTI (transmission time interval). For example, in the case of multi-antenna transmission, there may be multiple (e.g., two) dynamically-sized transport blocks per TTI.

FIG. 14 illustrates a processing procedure for DL-SCH transmission in conducting an LTE downlink transmission process. The second processing procedure corresponding to the second transport block is provided only in the case of downlink spatial multiplexing. In the case of spatial multiplexing, two different-size transport blocks may be typically combined with each other through antenna mapping. The LTE downlink transport channel processing method illustrated in FIG. 14 is now described.

(1) Insertion of CRC Per Transport Block

At the first step of the transport channel processing, a 24-bit CRC may be computed and the same may be added to each transport block. Errors in the decoded transport blocks may be detected at the reception end through the CRC. For example, a downlink HARQ protocol may be used to inform the detected errors and to request re-transmission.

(2) Segmentation of Code Block and Insertion of CRC Per Code Block

The interleaver in the LTE turbo code may be restricted as per size, and the same may be defined only for a limited size of code blocks having a specific bit in the maximum block size. In case the size of the CRC-added transport block is more than the maximum code block size, code block segmentation may be conducted before turbo coding is conducted. The code block segmentation refers to dividing the transport block into smaller code blocks that fit the code block size defined in the turbo code.

Figure 15:
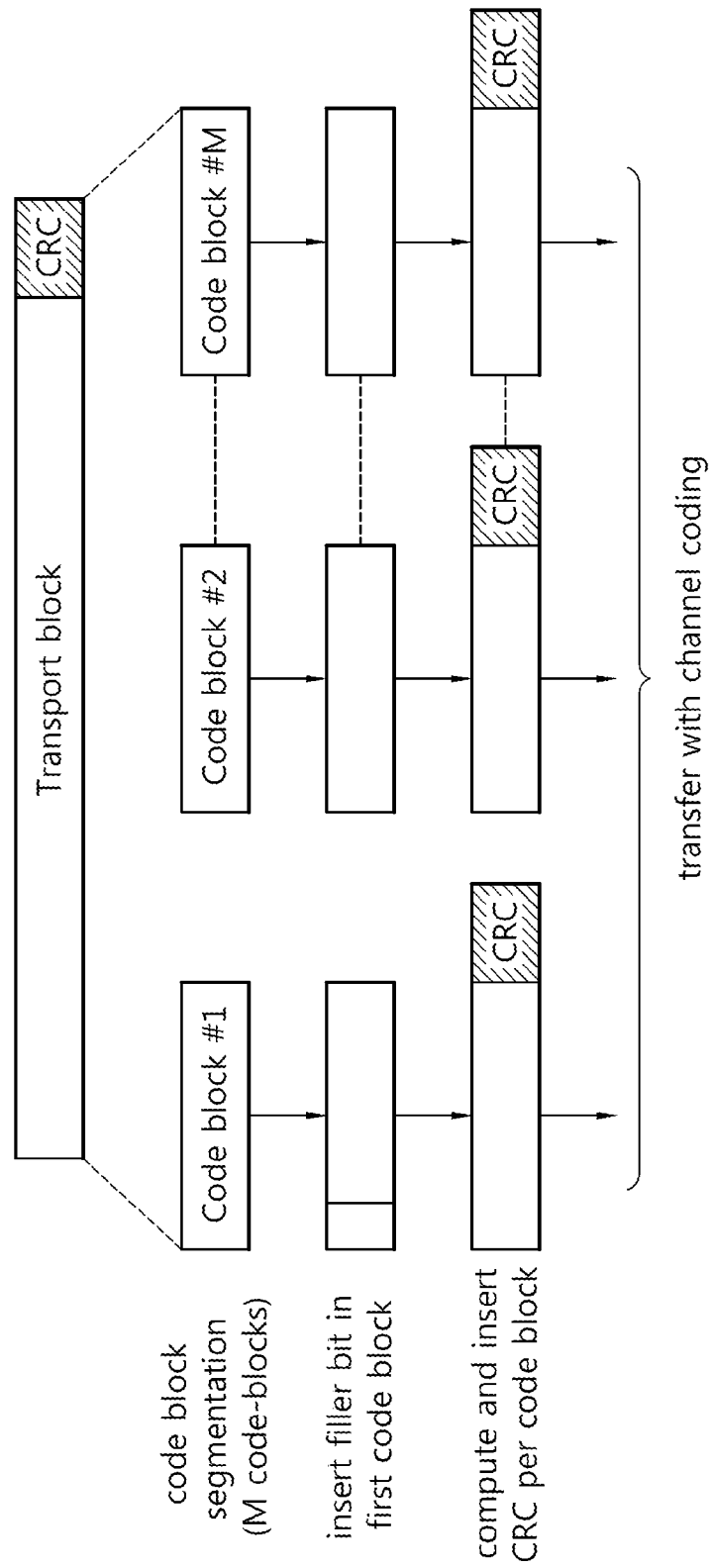
FIG. 15 is a concept view illustrating a method for performing code block division.

FIG. 15 is a concept view illustrating a method for performing code block division.

Referring to FIG. 15, the "code block division" may mean calculating and adding an additional CRC per code block. If each code block has a CRC, a decoded code block may be known earlier, and accordingly, iterative decoding on the code block may be quickly done. Accordingly, the UE's processing power consumption and power consumption may be reduced. In case one transport block is one code block without code block division, no CRC may be added to the code block.

In case code block division is made, whether the whole transport block is properly received may be indirectly known from the respective CRCs of the code blocks. Additional error detection based on the transport block CRCs may be performed to reduce the risk that errors are not detected from the decoded transport block.

(3) Turbo Coding

In LTE systems, the WCDMA/HSPA turbo encoder internal interleaver has been replaced with QPP (quadrature permutation polynomial)-based interleaving. Contrary to the WCDMA/HSPA turbo code interleaver, the QPP-based interleaver is a maximally contention-free interleaver, and thus, the QPP-based interleaver may enable simple parallelization of a decoding process without collision even when different parallel processes approach the interleaver memory.

(4) Rate Matching and Physical Layer HARQ Function.

Rate matching and physical layer HARQ are for correct selection of bits to be transmitted within a given TTI from the blocks of the code bits transferred from the channel encoder. The outputs from the turbo encoder (systematic bits, first parity bits, and second parity bits) each may be first subjected to interleaving. The interleaved bits may enter the circular buffer. The bit selection block extracts as many consecutive bits as the allocated resources from the circular buffer.

Figure 16:
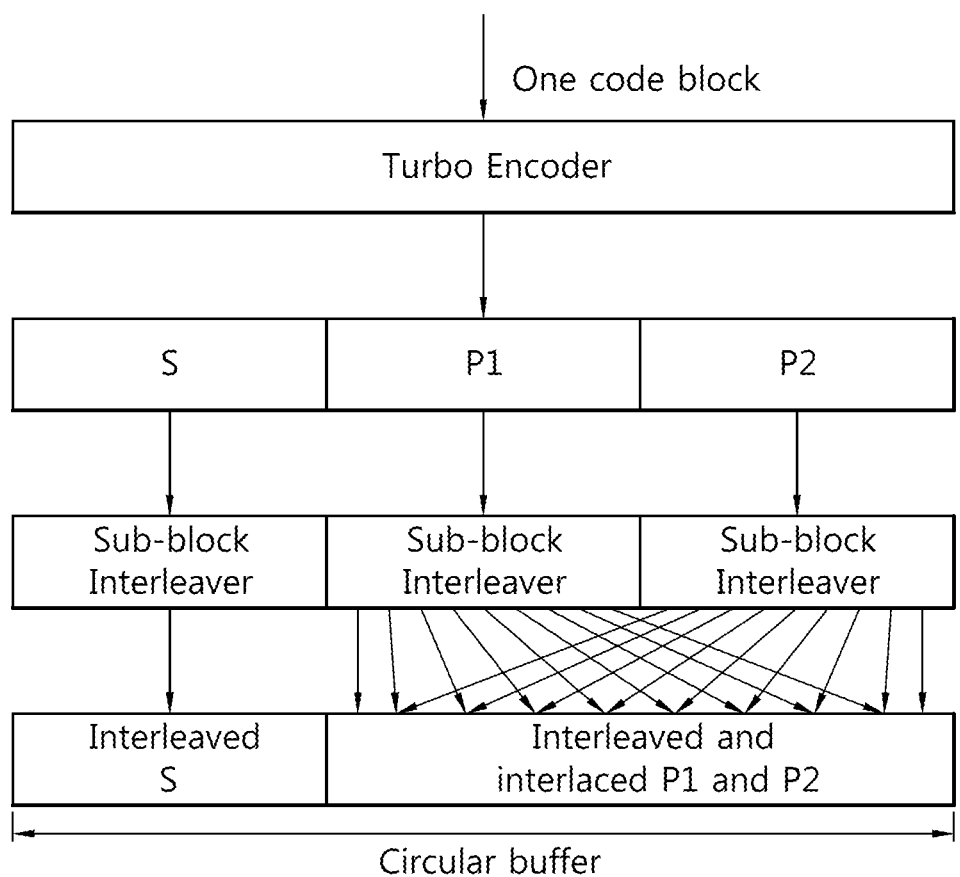
FIG. 16 is a concept view illustrating a method for performing rate matching.

FIG. 16 is a concept view illustrating a method for performing rate matching.

Referring to FIG. 16, the amount of radio resources used upon actual transmission is constant. Accordingly, to meet this, the encoded code block should be subjected to rate matching. Generally, rate matching includes puncturing and repetition. Rate matching may be conducted on a per-encoded code block basis as in the 3GPP WCDMA. FIG. 16 is a block diagram illustrating a method of performing the same with the system bit part and parity bit part of the encoded code block separated. Assume here that the code rate is 1/3.

(5) Per-Bit Scrambling

LTE downlink scrambling refers to multiplying the blocks of code bits that have undergone the rate matching and HARQ by a per-bit scrambling sequence. In LTE systems, downlink scrambling may apply to code bits of each transport channel.

(6) Data Modulation

Downlink data modulation denotes a process of transforming scrambled bits into corresponding complex modulated symbols. The LTE downlink supports the following modulation schemes: QPSK, 16QAM, and 64 QAM. According to an embodiment of the disclosure, an example in which 256 QAM is also supported as an additional modulation scheme is described. In the modulation schemes, QPSK, 16QAM, and 64QAM respectively may correspond to two bits per symbol, four bits per symbol, and six bits per symbol. Different modulation schemes may be put in use depending on transport channels.

(7) Antenna Mapping

Typically, antenna mapping simultaneously processes modulation symbols corresponding to two transport blocks and maps the processed results to different antenna ports.

(8) Resource Block Mapping

Resource block mapping maps symbols to be transmitted through respective antenna ports to resource elements of resource blocks allocated to transport blocks transmitted to the terminal by an MAC scheduler.

Some resource elements in the resource blocks may be pre-occupied by other antenna port or control region, and such resource elements cannot be put in use.

The base station may use a downlink control channel (e.g., a PDCCH or ePDCCH) in order to transfer a data block size to the terminal. The information on the data block size transmitted through the PDSCH may be transmitted based on the resource allocation information and MCS, information related to modulation and coding rate. The MCS field may carry MCS information to the terminal based on, e.g., five bits. Resource allocation may be conducted from 1 RB to 110 RBs. In case the five bits of the MCS field all are in use in order to transmit MCS information without use of MIMO, 32 types of MCS information may be transmitted based on the five bits. In such case, a data block size corresponding to 32×110 may be signaled. However, among the 32 types of MCS information, three types of MCS information are used to indicate a change of modulation scheme when re-transmission is conducted, and signaling may be actually done for a data block size corresponding to 29×110. A data block may mean a transport block.

The legacy LTE systems may support modulation schemes such as QPSK, 16QAM, and 64QAM. At the switching point where a change of modulation scheme occurs, the same data block size may be indicated if the same resource allocation was received. This is for efficiently performing an operation in various channel environments. In order to indicate the actual data block size, the MCS related information transmitted through the downlink control channel, $I_{MCS}$, may be mapped to another variable to indicate the data block size, $I_{TBS}$. The following Table 5 represents the relationship between $I_{MCS}$ and $I_{TBS}$.

TABLE 8

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |

TABLE 8-continued

| MCS Index $I_{MCS}$ | Modulation Order $Q_m$ | TBS Index $I_{TBS}$ |
|---|---|---|
| 28 | 6 | 26 |
| 29 | 2 | reserved |

The transport block size transmitted on downlink may be determined by a combination of the resource allocation and the MCS field transmitted through a downlink control channel. The following Tables 9 and 10 represent the respective transport block sizes for resource allocation of 1 RB to 10 RBs and resource allocation of 101 RBs to 110 RBs, under the above-described Table 8 relationship $I_{MCS}$-to-$I_{TBS}$.

TABLE 9

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 10

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

In case 256QAM, as modulation scheme, is supported according to an embodiment of the present invention. A method for determining transport block size is disclosed.

Disclosed is a method for determining transport block size without varying the legacy IMCS-to-ITBS relationship in case the 256QAM is supported as a modulation scheme according to an embodiment of the present invention.

This is about a method for determining transport block size. Assume determining transport block size by combinations of values derived in the MCS field transmitted on the downlink control channel and resource allocations transmitted on the downlink control channel.

A transport block may be transmitted to the UE through a downlink data channel. The size of data payload transmitted varies depending on resources used for transmission of a downlink control signal. Accordingly, there is a need for assuming resources to be used to transmit control signals and control data through the downlink in order to determine transport block size to support the 256QAM modulation scheme.

As resources used to transmit control signals and control data through the downlink, there are resources to transmit PSSs/SSSs, reference signals (cell-specific/UE-specific), and downlink control channels (e.g., PDCCH/EPDCCH). Further, since the amount of resources used for control signal transmission varies depending on antenna configurations, the antenna configuration should also be taken into account.

What should be further considered is a system with reduced resource amount used for transmission of downlink control signals such as NCT sub-frames. Hereinafter, a method for computing transport block size for each of legacy sub-frame, MBSFN (multicast-broadcast single frequency network) sub-frame, and NCT sub-frame is described.

(1) Method for Computing Transport Block Size for Legacy Sub-Frame

Assume there is no PSS/SSS transmission

Assume PDCCH is transmitted through three OFDM symbols

Reference signal transmission: Assume CRS transmission based on two antenna ports with a 2×2 antenna configuration (given high throughput for a particular MCS, assume CRS transmission based on four antenna ports with a 4×4 antenna configuration)

(2) MBSFN Sub-Frame

Assume there is no PSS/SSS transmission

Assume PDCCH is transmitted through two OFDM symbols

Reference signal transmission: Assume two-antenna port CRS with a 2×2 antenna configuration is transmitted through first two OFDM symbols of the sub-frame (given high throughput for a particular MCS, assume four-antenna port CRS with a 4×4 antenna configuration is transmitted through first two OFDM symbols of the sub-frame)

(3) NCT Sub-Frame

Assume there is no PSS/SSS transmission

Assume there is no PDCCH transmission

Assume one RB is allocated for EPDCCH transmission depending on system band size: Assume allocation of downlink resource for EPDCCH transmission in case system band is a predetermined value or larger. For example, assume allocation of downlink resources for EPDCCH transmission in case system bandwidth is 50RBs or 100RBs or larger Assume there is no EPDCCH transmission under cross carrier scheduling Reference signal transmission: Assume transmission of URS (User-Specific Reference Signal) using eight antenna ports with an 8×8 antenna configuration The above-described assumptions (1) to (3) may apply to all or some MCS indexes upon determining transport block size.

The method for determining transport block size according to an embodiment of the present invention enables the relationship, $I_{MCS}$-to-$I_{TBS}$, used in the legacy modulation schemes, QPSK, 16QAM, and 64QAM, to be used to determine transport block size supportive of the 256QAM. In case the 256QAM is used as modulation scheme, the resource allocation size may be determined based on the information on the resource allocation size obtained when using the legacy modulation schemes, QPSK, 16QAM, and 64QAM. In other words, the size of transport blocks used in the 256QAM modulation scheme may be calculated in such a manner as to convert increments of the data size obtained by the 256QAM modulation scheme into increments of resource allocation. The size of transport blocks used in the 256QAM may be determined based on MCS signaling and resource allocation used in the QPSK, 16QAM, and 64QAM.

Use of such method enables, without additionally configuring in the 256QAM modulation scheme in the $I_{MCS}$ field, calculation of transport block size information allocated in case the 256QAM is used by newly configuring resource allocation information.

In this case, the UE requires additional signaling from the base station to indicate that the 256QAM has been used as modulation scheme. When signaling to indicate the 256QAM is transmitted to the UE, all or some of the $I_{MCS}$ indexes corresponding to QPSK, 16QAM, and 64QAM of the above-described Table 8, may be used as the $I_{MCS}$ index for use in the 256QAM index.

The resource allocation used when the 256QAM is used may be determined according to the following Equation 5.

$$N_{PRB} = a \cdot N'_{PRB} + b \qquad \text{<Equation 5>}$$

a and b may be values determined depending on modulation schemes. Either a or b may be 0.

For example, Equation 5 may be determined depending on modulation schemes as in the following Equation 6.

<Equation 6>

$$N_{PRB} = \begin{cases} 4 \cdot N'_{PRB}, & \text{if MCS signaling indicates QPSK modulation} \\ 2 \cdot N'_{PRB}, & \text{if MCS signaling indicates 16QAM modulation} \\ 4/3 \cdot N'_{PRB}, & \text{if MCS signaling indicates 64QAM modulation} \end{cases}$$

$$N_{PRB} = \begin{cases} 4 \cdot N'_{PRB}, & \text{if MCS signaling indicates QPSK modulation} \\ 2 \cdot N'_{PRB}, & \text{if MCS signaling indicates 16QAM modulation} \\ 4/3 \cdot N'_{PRB}, & \text{if MCS signaling indicates 64QAM modulation} \end{cases}$$

$$N_{PRB} = \begin{cases} 4 \cdot N'_{PRB}, & \text{if MCS signaling indicates QPSK modulation} \\ 2 \cdot N'_{PRB}, & \text{if MCS signaling indicates 16QAM modulation} \\ 4/3 \cdot N'_{PRB}, & \text{if MCS signaling indicates 64QAM modulation} \end{cases}$$

Referring to Equation 6, in case MCS signaling indicates the QPSK modulation scheme, based on the value obtained by multiplying $N'_{PRB}$ by 4, $N_{PRB}$, a resource allocation value for 256QAM, may be calculated. In case MCS signaling indicates the 16QAM modulation scheme, based on the value obtained by multiplying $N'_{PRB}$ used in the 16QAM modulation scheme by two, $N_{PRB}$, a resource allocation value for 256QAM, may be calculated. In case MCS signaling indicates the 64QAM modulation scheme, based on the value obtained by multiplying $N'_{PRB}$ used in the 64QAM modulation scheme by 4/3, $N_{PRB}$, a resource allocation value for 256QAM, may be calculated.

Here, $N'_{PRB}$ may be derived from resource allocation information transmitted through the downlink control channel. $N'_{PRB}$ may indicate the total number of allocated PRBs (Physical Resource Blocks).

For example, assume that signaling to indicate the 256QAM and signaling to indicate the $I_{MCS}$ 21 and that 30 RBs have been allocated to the UE are transmitted to the UE. In such case, the UE may calculate the transport block size corresponding to resource allocation of 40RBs that are 4/3 of 30 RBs allocated based on Equation 6. The UE may calculate the transport block size corresponding to the $I_{MCS}$ index 21 and resource allocation of 40RBs. Since the maximum resource allocation supported by downlink control channels is 110RBs, use of the above transport block size determining method for 256QAM support poses a limitation on resource allocation. $N_{PRB}$ obtained using Equation 5 based on the resource allocation used in the legacy modulation scheme upon use of the 256QAM as modulation scheme should not exceed 110RBs.

Accordingly, in order to derive resource allocation upon use of the 256QAM, the $N'_{PRB}$ of QPSK may be limited to resource allocation of 27RBs, $N'_{PRB}$ of 16QAM to resource allocation of 55RBs, and $N'_{PRB}$ of 64QAM to resource allocation of 82RBs. Further, limitations may be imposed on the resource allocation for 256QAM modulation scheme regardless of the above signaling methods.

Figure 17:
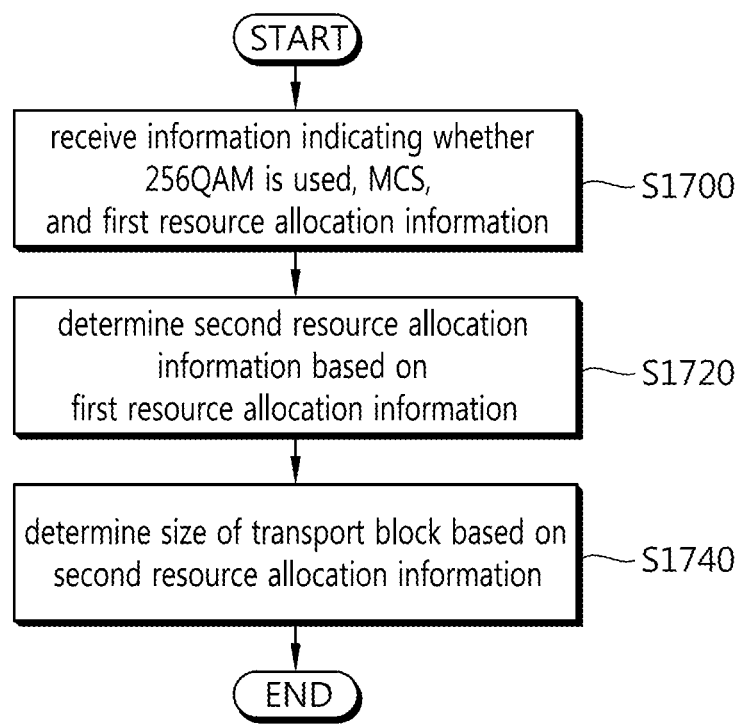
FIG. 17 is a flowchart illustrating a method for computing the size of a transmission block in the 256QAM according to an embodiment of the present invention.

FIG. 17 is a flowchart illustrating a method for computing the size of a transmission block in the 256QAM according to an embodiment of the present invention.

Referring to FIG. 17, the UE receives, from the base station, information to indicate that the 256QAM has been used as modulation scheme and information related to first resource allocation (step S1700).

The UE may receive the $I_{MCS}$ field and first resource allocation information based on the DCI transmitted through the downlink channel. Further, the UE may receive information indicating that the modulation scheme used in the currently allocated resource blocks is the 256QAM, from the base station.

The UE calculates second resource allocation information used in the 256QAM based on the received first resource allocation information (step S1720).

As described above, according to the present invention, without additionally configuring the modulation scheme for 256QAM in the $I_{MCS}$ field, the resource allocation information may be newly configured to calculate the transport block size information used in the resource blocks using the 256QAM. The second resource allocation information, the size of resource blocks using the 256QAM, may be obtained based on the received first resource allocation information following Equation 5 or 6.

In case carrier aggregation is used, the DCI may be transmitted through the P (primary) cell or S (secondary) cell. The second resource allocation information used in the 256QAM as determined based on the information transmitted through the DCI may be information on the resource block allocated to at least one of the P-cell and the S-cell.

A transport block size is determined based on the second resource allocation information (step S1740).

A transport block size may be calculated based on the second resource allocation information. In order to calculate transport block size based on the second resource allocation information, a table in which transport block sizes are predefined depending on the number of resource blocks allocated in the second resource allocation information may be used.

Further, different tables in which transport block size is predefined depending on the number of resource blocks allocated in the second resource allocation information as described above may be used depending on whether the sub-frame where the transport block is allocated is the legacy frame, MBSFN sub-frame or NCT sub-frame.

Described is hereinafter a method for calculating resource block size based on a table where transport block size is predefined depending on the number of resource blocks allocated in the second resource allocation information. For ease of description, in the disclosed method, cross carrier scheduling is performed to determinate the transport block size of NCT sub-frame where EPDCCH data is transmitted in one RB and NCT sub-frame where no EPDCCH is transmitted.

The downlink data transmission rate may be increased as the 256QAM modulation scheme is supported. In order to support the largest transport block size, transport block size may be determined assuming the minimum resources used for downlink control channel transmission. The largest transport block size may be determined using the MCS level corresponding to the highest coding rate and the 256QAM modulation scheme.

The highest coding rate allowed for a particular modulation scheme may be assumed to be 0.93. For example, the largest transport block size may be designed assuming that the coding rate is 0.925781 and the NCS sub-frame for downlink control channel. In this case, without assuming EPDCCH transmission, the number of resource elements (REs) available for data transmission may be 144 per resource block.

The following Table 11 assumes that the resource allocation in the 256QAM is from 91RBs to 110RBs and no EPDCCH is transmitted.

TABLE 11

| $N_{PRB}$ | Transport block size | Effective coding rate |
|---|---|---|
| 91 | 96872 | 0.924068987 |
| 92 | 97896 | 0.923686594 |
| 93 | 98576 | 0.920101553 |
| 94 | 99664 | 0.92036052 |
| 95 | 100752 | 0.920614035 |
| 96 | 101840 | 0.920862 |
| 97 | 102928 | 0.921105384 |
| 98 | 104376 | 0.924532313 |
| 99 | 105528 | 0.925294613 |
| 100 | 106680 | 0.926041667 |
| 101 | 107832 | 0.926773927 |
| 102 | 108984 | 0.92749183 |
| 103 | 110136 | 0.928195793 |
| 104 | 111392 | 0.929754274 |
| 105 | 111392 | 0.920899471 |
| 106 | 112608 | 0.922169811 |
| 107 | 113824 | 0.923416407 |
| 108 | 115040 | 0.924639918 |
| 109 | 116256 | 0.925840979 |
| 110 | 117256 | 0.925315657 |

Table 10 shows the size of transport blocks transmittable through the NCT sub-frame in case cross carrier scheduling is used. It may be assumed in Table 10 that the resources for EPDCCH are not allocated to the NCT sub-frame. In case the 256QAM is supportive and no MIMO is assumed, the transport block size corresponding to 110 $N_{PRB}$ in Table 10 may become the largest transport block size.

The following Table 12 assumes that the resource allocation in the 256QAM is from 91RBs to 110RBs and one RB is allocated to the NCT sub-frame in the EPDCCH.

TABLE 12

| $N_{PRB}$ | Transport block size | Effective coding rate |
|---|---|---|
| 91 | 95846 | 0.924441 |
| 92 | 96872 | 0.924068987 |
| 93 | 97896 | 0.923686594 |
| 94 | 98576 | 0.920101553 |
| 95 | 99664 | 0.92036052 |
| 96 | 100752 | 0.920614035 |
| 97 | 101840 | 0.920862 |
| 98 | 102928 | 0.921105384 |
| 99 | 104376 | 0.924532313 |
| 100 | 105528 | 0.925294613 |
| 101 | 106680 | 0.926041667 |

TABLE 12-continued

| $N_{PRB}$ | Transport block size | Effective coding rate |
|---|---|---|
| 102 | 107832 | 0.926773927 |
| 103 | 108984 | 0.92749183 |
| 104 | 110136 | 0.928195793 |
| 105 | 111392 | 0.929754274 |
| 106 | 111392 | 0.920899471 |
| 107 | 112608 | 0.922169811 |
| 108 | 113824 | 0.923416407 |
| 109 | 115040 | 0.924639918 |
| 110 | 116256 | 0.925840979 |

Table 12 shows the transport block size and coding rate for each of the cases where one RB is assumed for EPDCCH transmission in the NCT sub-frame and not. In case x RBs are assumed to be used for EPDCCH transmission, the transport block size corresponding to the actual number of RBs obtained by excluding x RBs from the resources allocated in the downlink control channel may be calculated. Likewise, in case the 256QAM is supportive and no MIMO is assumed, the transport block size corresponding to 110 $N_{PRB}$ in Table 12 may become the largest transport block size.

According to another embodiment of the present invention, in case the 256QAM is used as modulation scheme, a method other than the method varying the resource allocation information may be used to determine transport block size.

Figure 18:
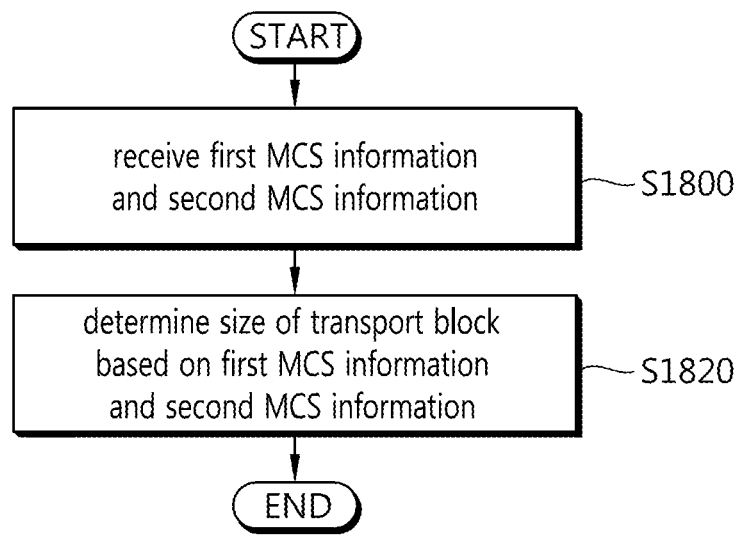
FIG. 18 is a flowchart illustrating a method for computing the size of a transmission block when using the 256QAM as a modulation scheme according to an embodiment of the present invention.

FIG. 18 is a flowchart illustrating a method for computing the size of a transmission block when using the 256QAM as a modulation scheme according to an embodiment of the present invention.

Referring to FIG. 18, the UE receives, from the base station, signaling indicating the information that the 256QAM is used and MCS index information (step S1800).

According to an embodiment of the present invention, the UE may receive the signaling indicating the information that the 256QAM is used for allocated resources and the MCS index information corresponding to the allocated resources, and based on this, may determine transport block size. The information that the UE uses the 256QAM for the allocated resources may be received through higher layer signaling, such as, e.g., RRC signaling. The MCS index information corresponding to the allocated resources may be received based on the DCI. The information that the 256QAM is used, as received through higher layer signaling such as RRC signaling may be denoted first MCS information, and the MCS index information transmitted through the DCI may be denoted second MCS information.

For example, the UE may produce $I_{TBS}$ information for determining transport block size based on the MCS index information corresponding to the allocated resources and the signaling indicating the information that the 256QAM is used for the resources. In other words, the UE, upon failure to receive the signaling indicating the information that the 256QAM is used for allocated resources, may produce the $I_{TBS}$ information based on Table 8. In contrast, the UE, upon receiving the signaling indicating the information that the 256QAM is used for allocated resources, may determine the information on the modulation scheme as 256QAM and the information on the coding method based on the MCS index.

Transport block size is determined based on the signaling indicating the information that the 256QAM is used and the MCS index information.

Based on the table where transport block size is defined depending on $I_{TBS}$ determined based on the MCS index information and the signaling indicating the information that the 256QAM is used, transport block size may be determined.

Figure 19:
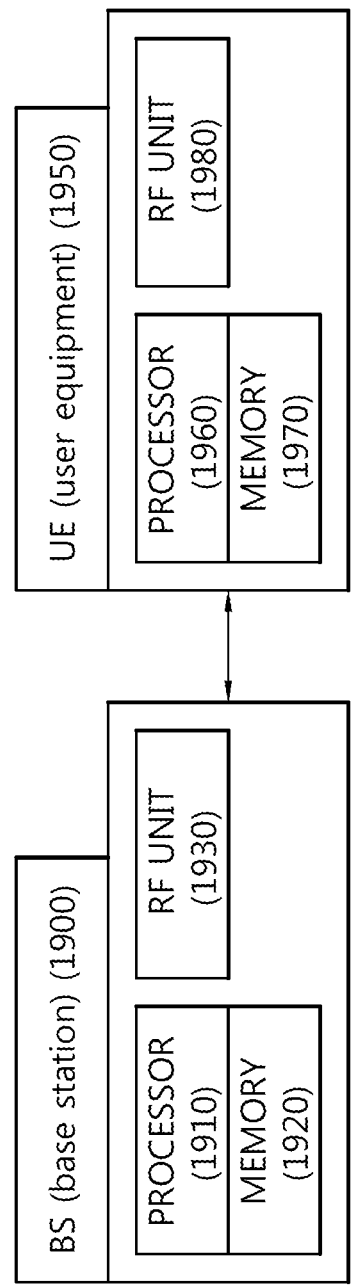
FIG. 19 is a block diagram illustrating a wireless communication system according to an embodiment of the disclosure.

FIG. 19 is a block diagram showing a wireless communication system according to an embodiment of the present invention.

Referring to FIG. 19, a BS 1900 includes a processor 1910, a memory 1920 and a RF unit 1430. The memory 1920 is connected to the processor 1910 and configured to store various information used for the operations for the processor 1910. The RF unit 1930 is connected to the processor 1910 and configured to transmit and/or receive a radio signal. The processor 1910 implements the proposed functions, processed, and/or methods. In the described embodiments, the operation of BS may be implemented by the processor 1910.

For example, the processor 1910 may be implemented to transmit, to the UE, the information indicating that the modulation scheme used for resource blocks allocated by the base station is the 256QAM and the information on the MCS indexes of the allocated resource blocks.

A wireless apparatus 1950 includes a processor 1960, a memory 1970, and a radio frequency (RF) unit 1980. The memory 1970 is connected to the processor 1960 and configured to store various information used for operating the processor 1960. The RF unit 1980 is connected to the processor 1960 and configured to transmit and/or receive a radio signal. The processor 1960 implements the proposed functions, processed, and/or methods. In the embodiments described above, the operation of the wireless apparatus may be implemented by the processor 1960.

For example, the processor 1960 may be implemented to receive information indicating that the modulation scheme used in the resource blocks allocated from the base station is the 256QAM, to determine first resource allocation information and an MCS index of the resource block allocated based on the DCI, to determine $I_{TBS}$ based on the MCS index, to determine second resource allocation information based on the first resource allocation information, and to determine the size of transport block based on the second resource allocation information and $I_{TBS}$. Here, the first resource allocation information may be information on resource allocation in case a modulation scheme other than the 256QAM is used, and the second resource allocation information may be information on resource allocation in case the 256QAM is used as modulation scheme.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving data by a user equipment (UE), the method comprising:
   receiving, from a base station, information that a modulation scheme used in an allocated resource block is 256 QAM (quadrature amplitude modulation);
   determining first resource allocation information and an MCS (modulation and coding scheme) index of the allocated resource allocation based on DCI (downlink control information);
   determining a $I_{TBS}$ based on the MCS index, wherein the $I_{TBS}$ indicates a data block size;
   determining second resource allocation information based on the first resource allocation information; and
   determining the size of a transport block based on the second resource allocation information and the $I_{TBS}$, wherein the second resource allocation information is determined by the following Equation:

$$N_{PRB}=a \cdot N'_{PRB}+b$$

wherein, a and b are values determined based on the MCS index, and a and b are not simultaneously zeros,
   wherein the $N'_{PRB}$ is the first resource allocation information and the $N_{PRB}$ is the second resource allocation information,
   wherein the first resource allocation information is information on resource allocation in a case where a modulation scheme other than the 256QAM is used, and
   wherein the second resource allocation information is information on resource allocation in a case where a modulation scheme using the 256QAM is used.

2. The method of claim 1,
   wherein a and b are determined based on the MCS index,
   wherein in a case where the MCS index indicates a QPSK (quadrature phase shift keying) modulation scheme, a=4 and b=0,
   wherein in a case where the MCS index indicates a 16QAM modulation scheme, a=2 and b=0, and
   wherein in a case where the MCS index indicates a 64QAM modulation scheme, a=4/3 and b=0.

3. The method of claim 1,
   wherein the DCI is information transmitted through a P (primary)-cell or an S (secondary)-cell,
   wherein the second resource allocation information is information on a resource block allocated to at least one cell of the P-cell and the S-cell,
   wherein the P-cell and the S-cell are cells that have undergone carrier aggregation, and
   wherein the S-cell is a cell activated by the P-cell.

4. The method of claim 1,
   wherein the size of the transport block is a value determined based on the size of a resource block allocated in an EPDCCH (enhanced physical downlink control channel),
   wherein the EPDCCH is a channel transmitting control data demodulated based on a DM (demodulation)-RS (reference signal),
   wherein an initial value for determining a RS sequence of the DM-RS is determined based on $c_{init}=(\lfloor n_s/2 \rfloor+1) \cdot (2n_{ID,i}^{EPDCCH}+1) \cdot 2^{16}+n_{SCID}^{EPDCCH}$, and
   wherein the $n_s$ is a slot number in a radio frame, the $n_{ID,i}^{EPDCCH}$ is a cell index related to a corresponding EPDCCH region, and the $n_{SCID}^{EPDCCH}$ is a parameter given through higher layer signaling.

5. A user equipment (UE) operating in a wireless communication system, the UE comprising:
   a radio frequency (RF) unit for transmitting or receiving a radio signal; and
   a processor that:
   controls the RF unit to receive, from a base station, information that a modulation scheme used in an allocated resource block is 256QAM (quadrature amplitude modulation),
   determines first resource allocation information and an MCS (modulation and coding scheme) index of the allocated resource allocation based on DCI (downlink control information),
   determines a $I_{TBS}$ based on the MCS index, to determine second resource allocation information based on the first resource allocation information, wherein the $I_{TBS}$ indicates a data block size, and
   determines the size of a transport block based on the second resource allocation information and the $I_{TBS}$,
   wherein the second resource allocation information is determined by the following Equation:

$$N_{PRB} = a \cdot N'_{PRB} + b$$

wherein, a and b are values determined based on the MCS index, and a and b are not simultaneously zeros,
   wherein the $N'_{PRB}$ is the first resource allocation information and the $N_{PRB}$ is the second resource allocation information,
   wherein the first resource allocation information is information on resource allocation in a case where a modulation scheme other than the 256QAM is used, and
   wherein the second resource allocation information is information on resource allocation in a case where a modulation scheme using the 256QAM is used.

6. The UE of claim 5,
   wherein a and b are determined based on the MCS index,
   wherein in a case where the MCS index indicates a QPSK (quadrature phase shift keying) modulation scheme, a=4 and b=0,
   wherein in a case where the MCS index indicates a 16QAM modulation scheme, a=2 and b=0, and
   wherein in a case where the MCS index indicates a 64QAM modulation scheme, a=4/3 and b=0.

7. The UE of claim 5,
   wherein the DCI is information transmitted through a P (primary)-cell or an S (secondary)-cell,
   wherein the second resource allocation information is information on a resource block allocated to at least one cell of the P-cell and the S-cell,
   wherein the P-cell and the S-cell are cells that have undergone carrier aggregation, and
   wherein the S-cell is a cell activated by the P-cell.

8. The UE of claim 5,
   wherein the size of the transport block is a value determined based on the size of a resource block allocated in an EPDCCH (enhanced physical downlink control channel),
   wherein the EPDCCH is a channel transmitting control data demodulated based on a DM (demodulation)-RS (reference signal),
   wherein an initial value for determining a RS sequence of the DM-RS is determined based on $c_{init} = (\lfloor n_s/2 \rfloor + 1) \cdot (2N_{ID,i}^{EPDCCH} + 1) \cdot 2^{16} + n_{SCID}^{EPDCCH}$, and
   wherein the $n_s$ is a slot number in a radio frame, the $n_{ID,i}^{EPDCCH}$ is a cell index related to a corresponding EPDCCH region, and the $n_{SCID}^{EPDCCH}$ is a parameter given through higher layer signaling.

* * * * *